(12) United States Patent
Garin et al.

(10) Patent No.: US 12,523,464 B2
(45) Date of Patent: Jan. 13, 2026

(54) METHOD AND DEVICE FOR INSPECTING CONTAINERS MOVED ON A RECTILINEAR PATH

(71) Applicant: TIAMA, St. Genis-Laval (FR)

(72) Inventors: Jean-François Garin, Saint Romain en Gal (FR); Marc Leconte, Loire sur Rhone (FR); Pierre-Yves Solane, Lyons (FR)

(73) Assignee: TIAMA, St. Genis-Laval (FR)

( * ) Notice: Subject to any disclaimer, the term of this patent is extended or adjusted under 35 U.S.C. 154(b) by 137 days.

(21) Appl. No.: 18/697,355

(22) PCT Filed: Sep. 29, 2022

(86) PCT No.: PCT/FR2022/051842
§ 371 (c)(1),
(2) Date: Mar. 29, 2024

(87) PCT Pub. No.: WO2023/052732
PCT Pub. Date: Apr. 6, 2023

(65) Prior Publication Data
US 2024/0401932 A1    Dec. 5, 2024

(30) Foreign Application Priority Data

Sep. 30, 2021    (FR) .................................... 2110358

(51) Int. Cl.
| | | |
|---|---|---|
| *G01B 11/10* | (2006.01) | |
| *H04N 23/56* | (2023.01) | |
| *H04N 23/90* | (2023.01) | |

(52) U.S. Cl.
CPC ........... *G01B 11/105* (2013.01); *H04N 23/56* (2023.01); *H04N 23/90* (2023.01)

(58) Field of Classification Search
CPC ...... G01B 11/105; H04N 23/56; H04N 23/90; G01N 21/8806; G01N 21/9036
See application file for complete search history.

(56) References Cited

U.S. PATENT DOCUMENTS

| | | | |
|---|---|---|---|
| 6,031,221 A | | 2/2000 | Furnas |
| 11,308,601 B2 * | | 4/2022 | Dordoni ................ H04N 23/56 |
| | | | (Continued) |

FOREIGN PATENT DOCUMENTS

| | | |
|---|---|---|
| DE | 29901727 U1 | 5/1999 |
| EP | 3088873 A2 | 2/2016 |
| | (Continued) | |

OTHER PUBLICATIONS

International Search Report issued in PCT/FR2022/051842 dated Feb. 3, 2023 (5 pages).

*Primary Examiner* — Seung C Sohn
(74) *Attorney, Agent, or Firm* — ROTHWELL, FIGG, ERNST & MANBECK, P.C.

(57) ABSTRACT

The invention relates to a method for inspecting containers, comprising:
providing a first source of light illuminating the containers, said source being composed of a plurality of elementary light sources that are controlled so as to define at least three illumination zones (S11);
providing at least three image sensors (C11, C12, C13);
acquiring at least one image of the container illuminated by an associated illumination zone, the elementary light sources of the illumination zones (S11) being controlled so that:
the at least three illumination zones (S11) associated with the image sensors have identical angular widths (L11);
the at least three illumination zones (S11) associated with the image sensors have symmetric angular widths (L11);

(Continued)

and at least two angularly neighbouring illumination zones have a common illumination portion (S112).

26 Claims, 11 Drawing Sheets

(56) References Cited

U.S. PATENT DOCUMENTS

2011/0175997 A1\* 7/2011 Case ................ G01N 21/8903
 348/92
2013/0120746 A1 5/2013 Buchwald et al.

FOREIGN PATENT DOCUMENTS

FR 2775079 A1 8/1999
WO 2012/010231 A1 1/2012

\* cited by examiner

[Fig. 1]
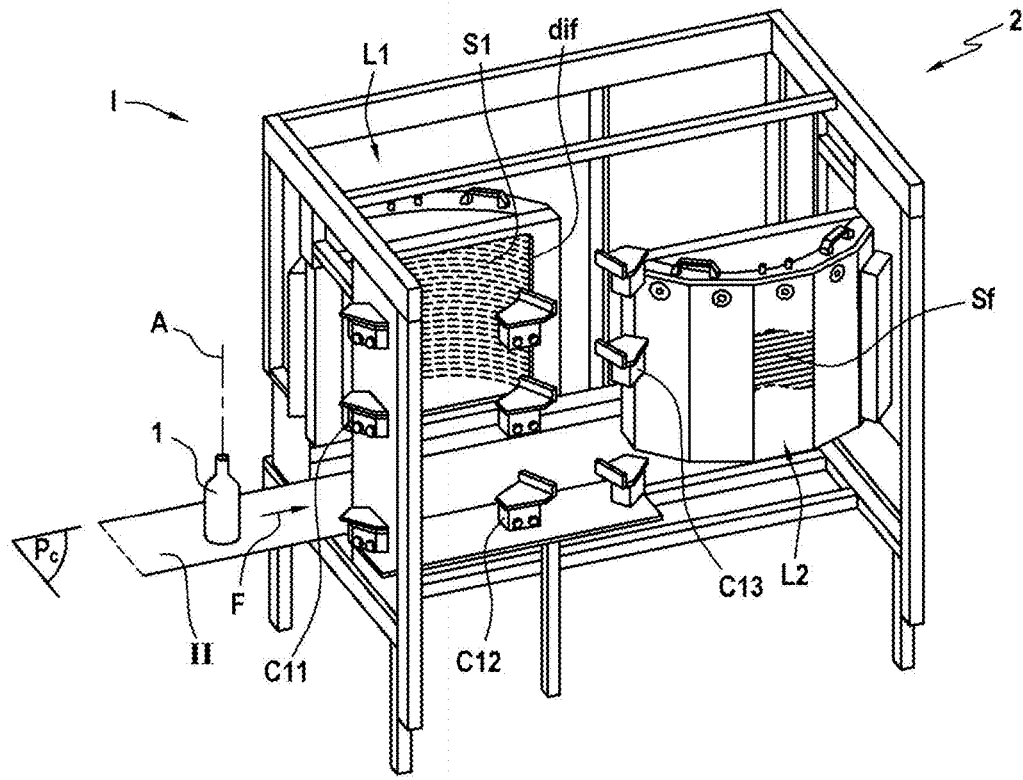
[Fig. 2]
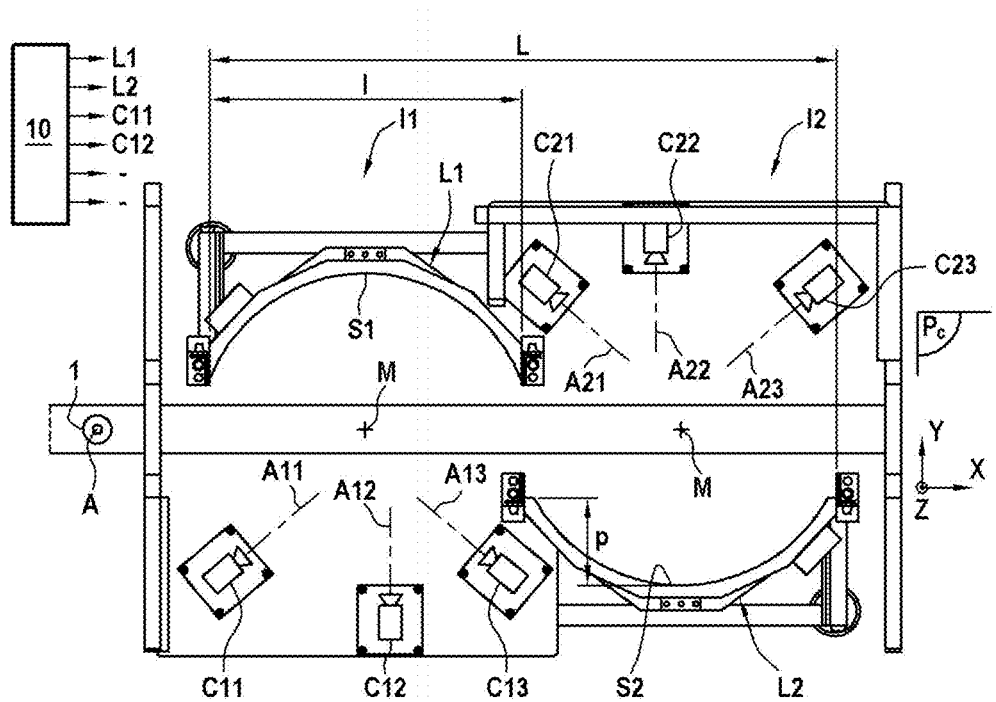

[Fig. 3]
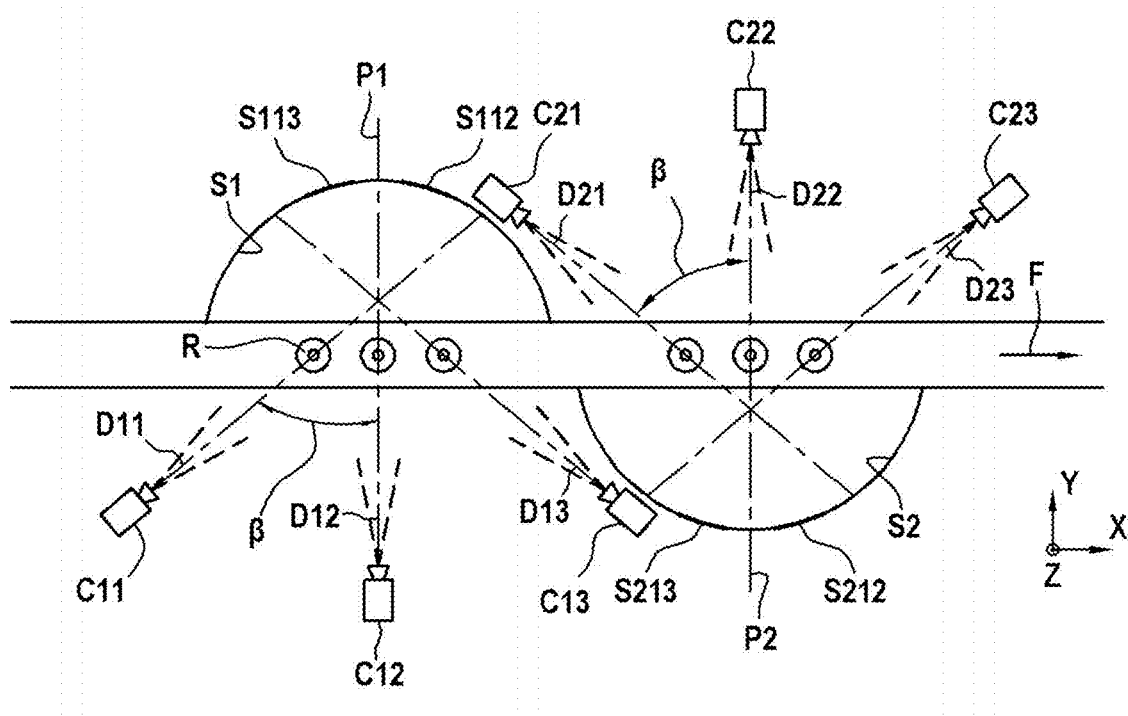
[Fig. 3A]
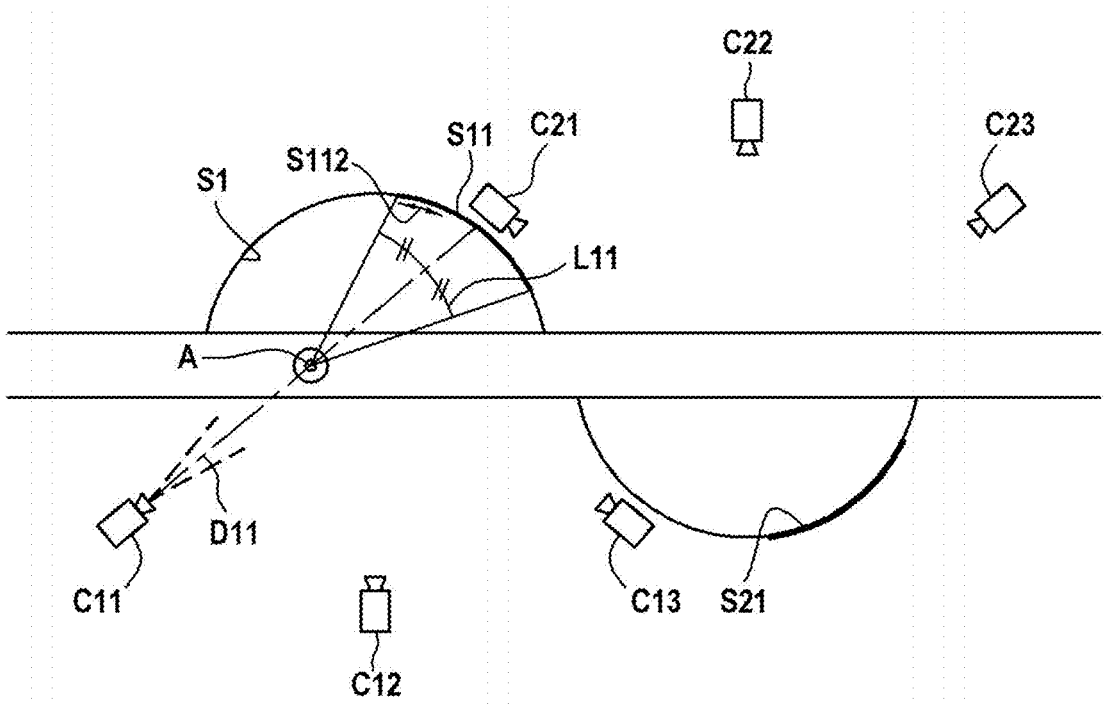

[Fig. 3B]
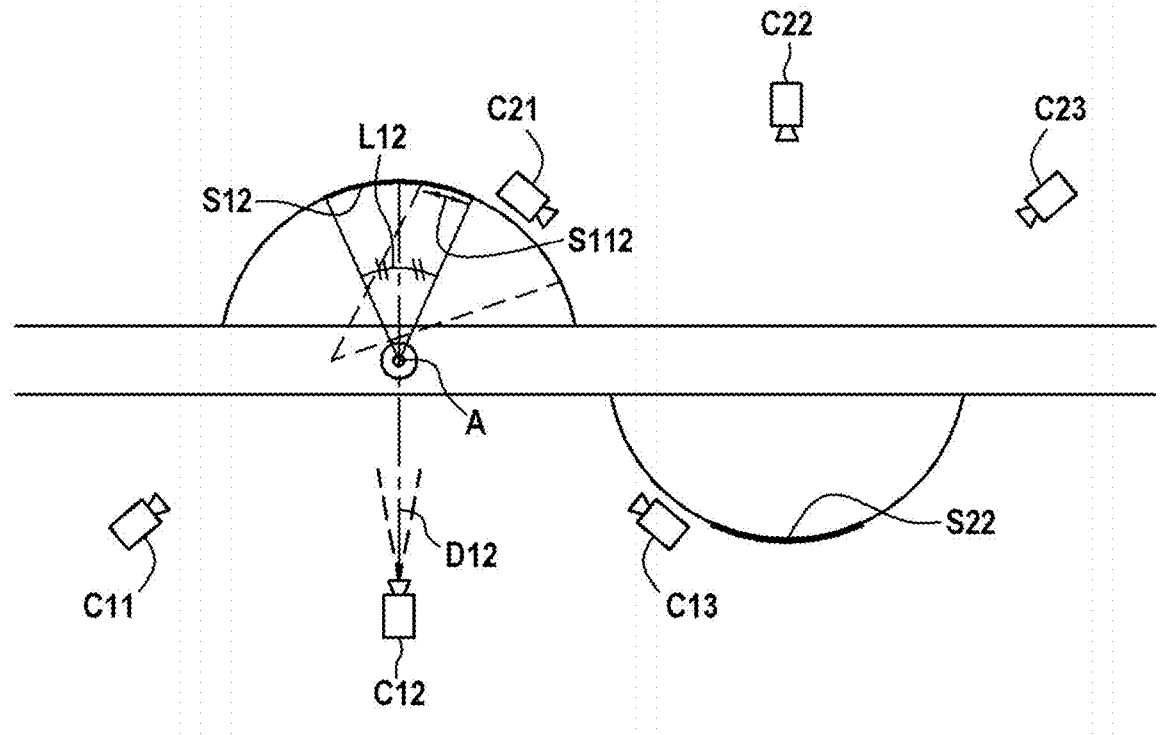
[Fig. 3C]
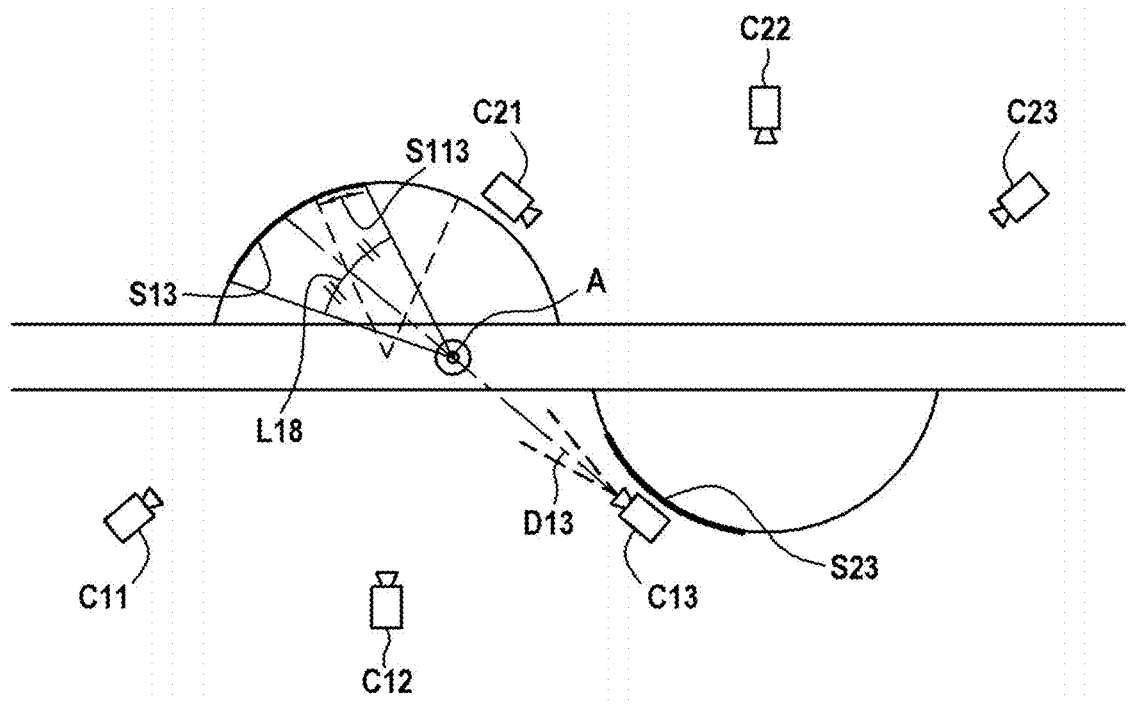

[Fig. 4A]
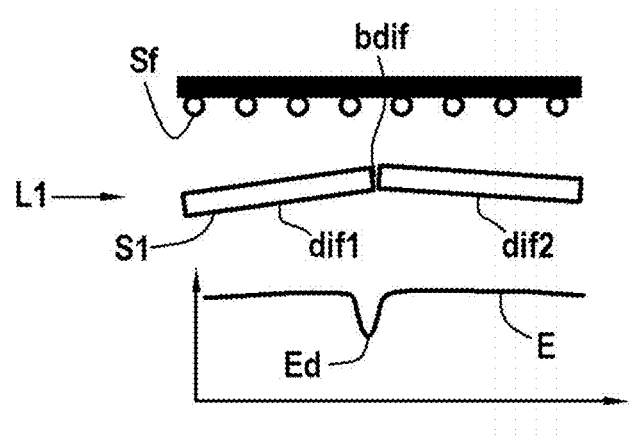
[Fig. 4B]
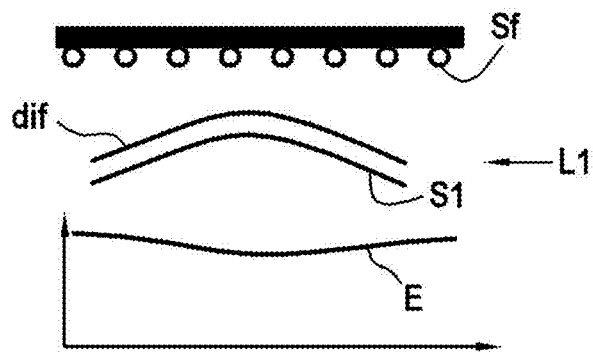
[Fig. 4C]
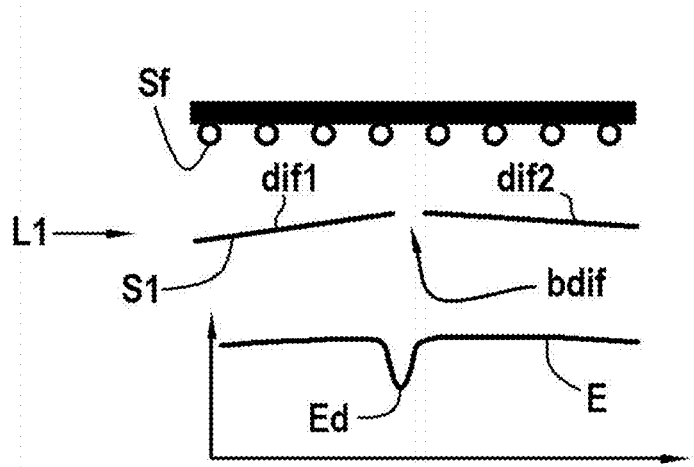

[Fig. 4D]
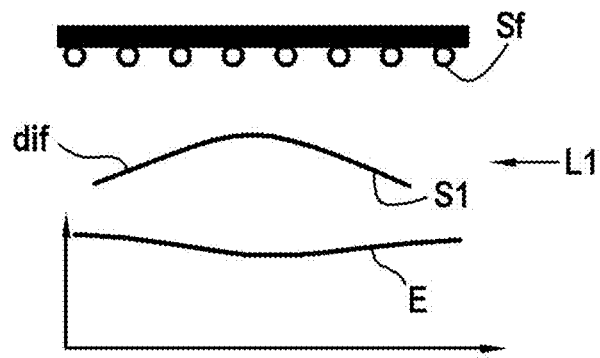
[Fig. 5A]
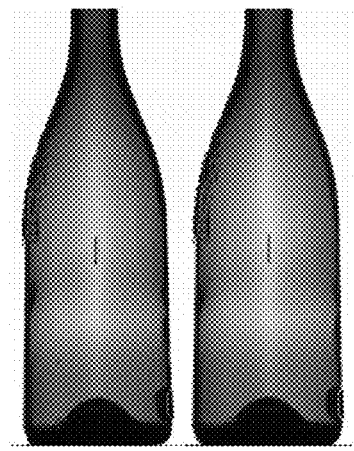
[Fig. 5B]
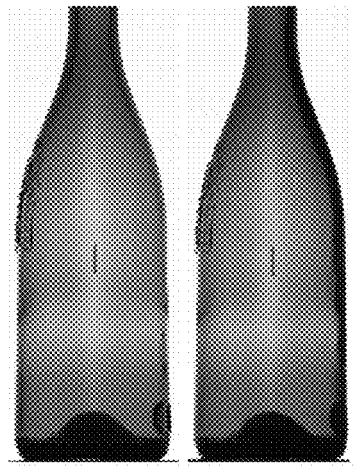

[Fig. 6A]
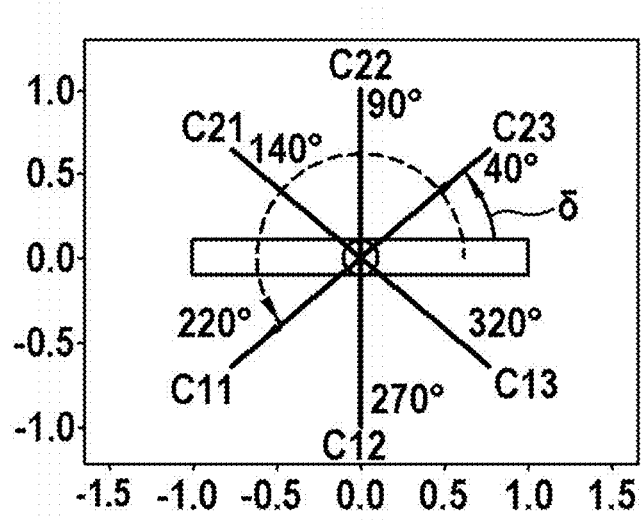
[Fig. 6B]
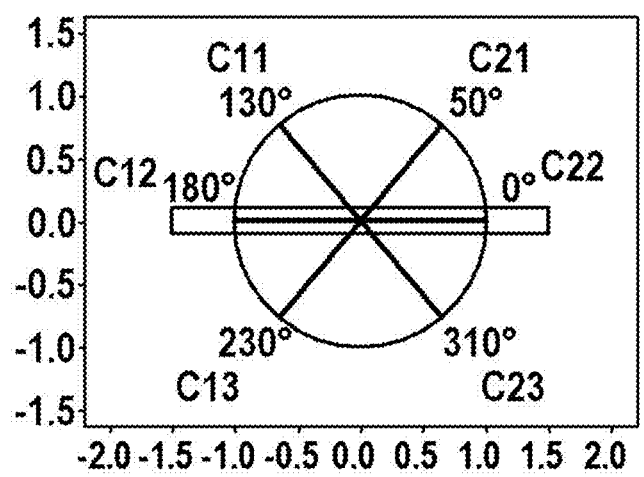

[Fig. 7A]
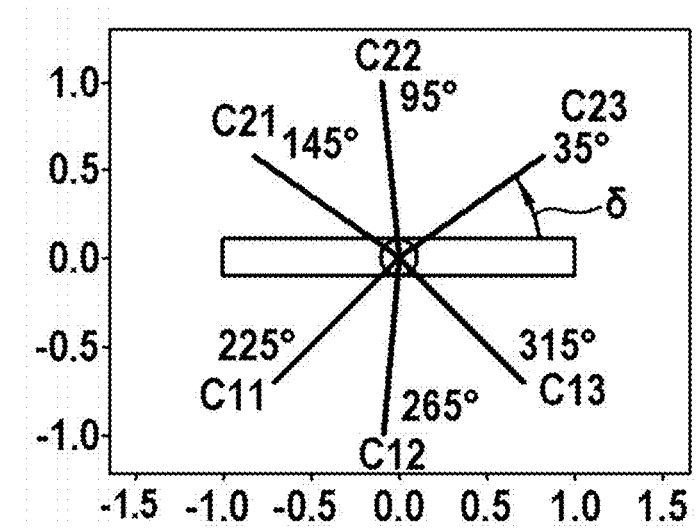
[Fig. 7B]
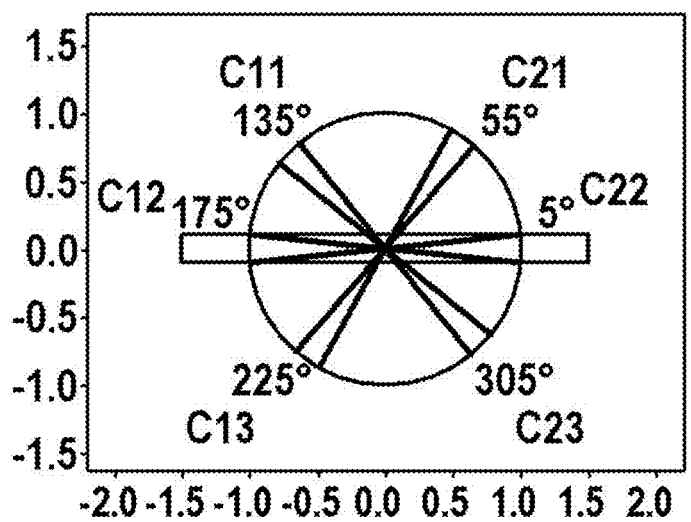

[Fig. 8A]
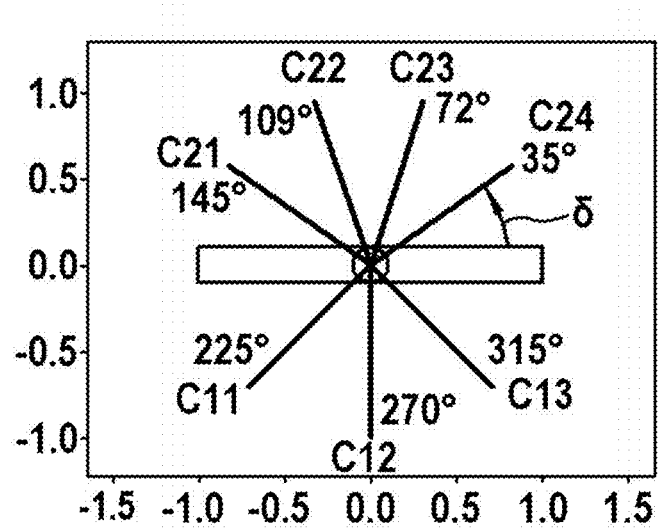
[Fig. 8B]
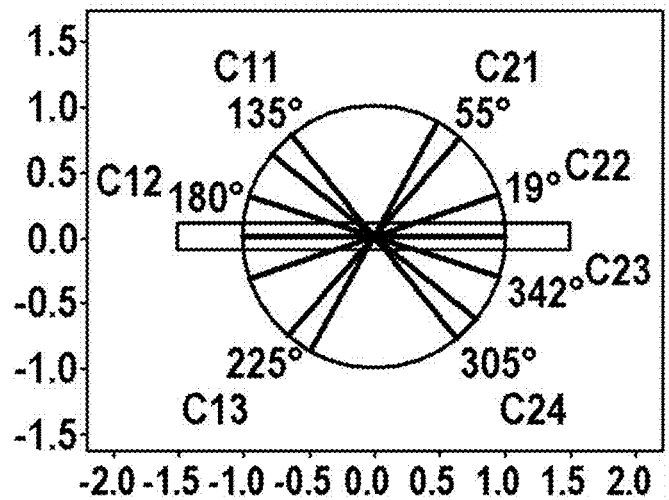

[Fig. 9A]
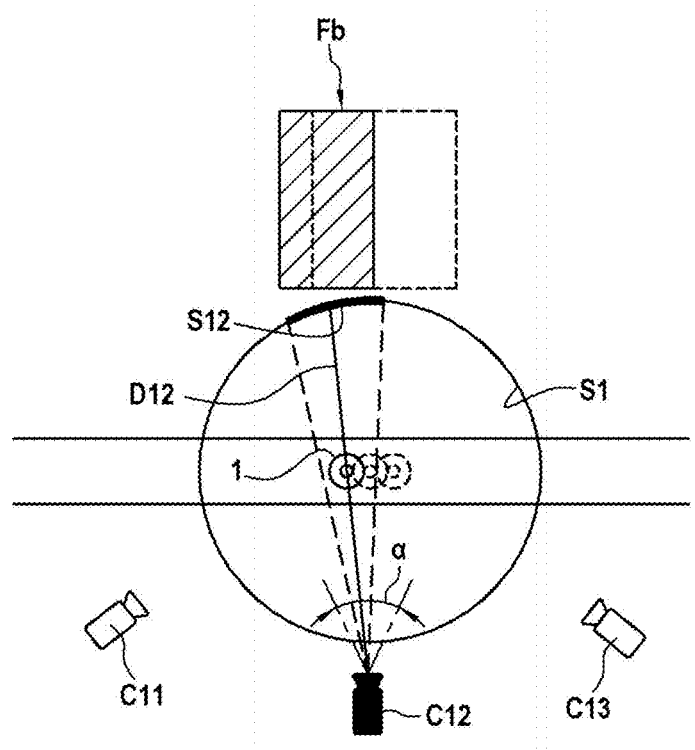
[Fig. 9B]
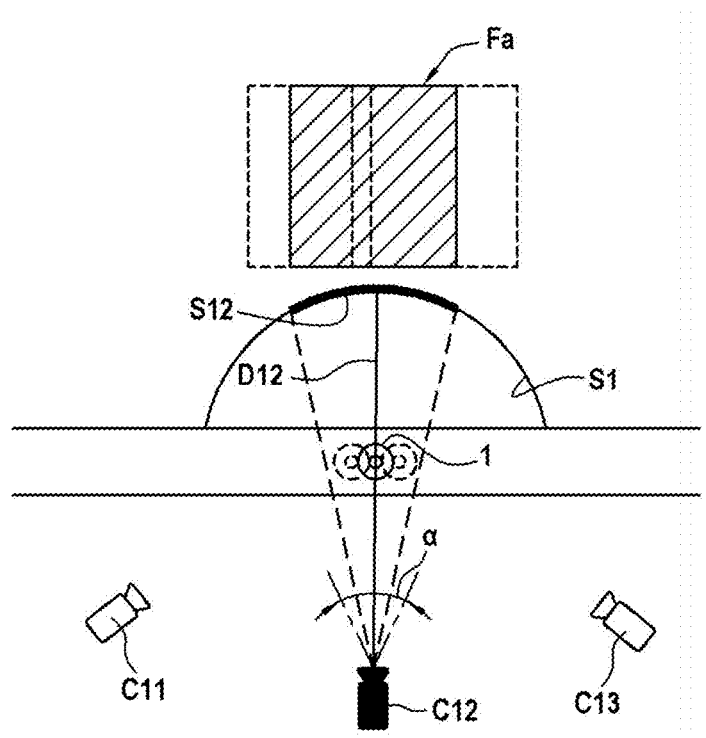

[Fig. 9C]
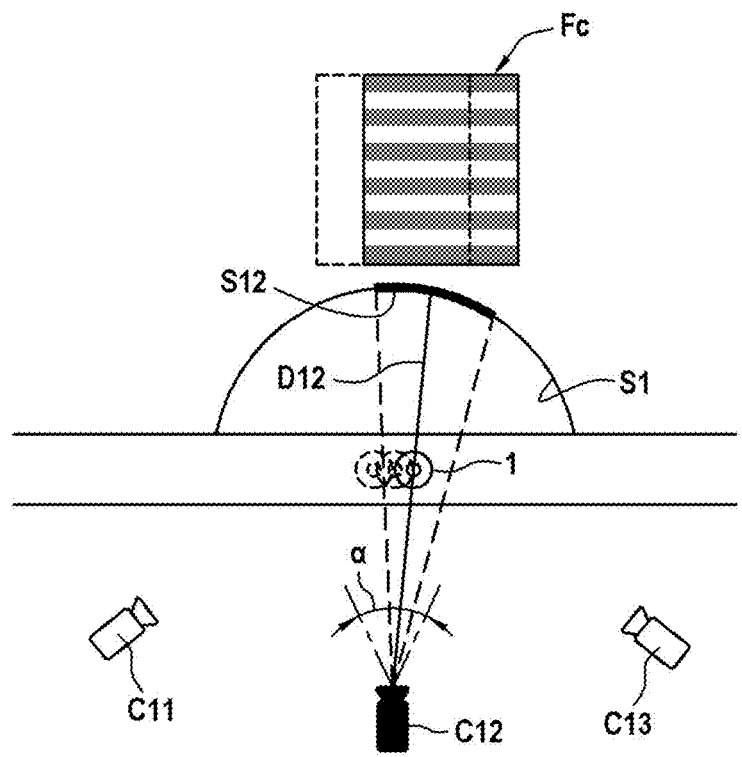
[Fig. 10]
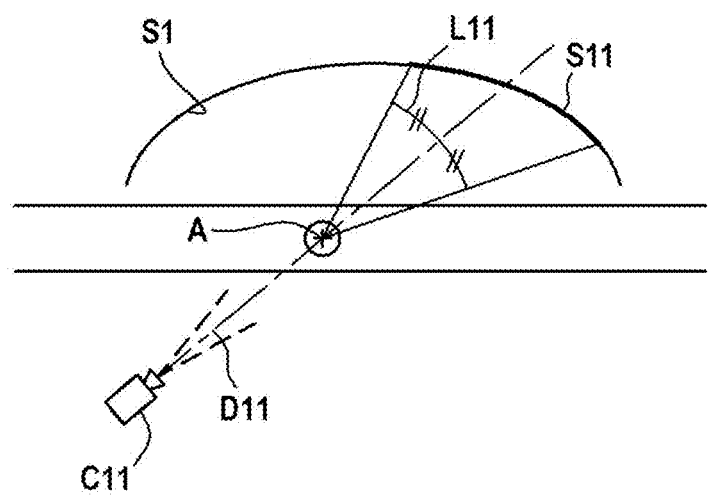

[Fig. 11]
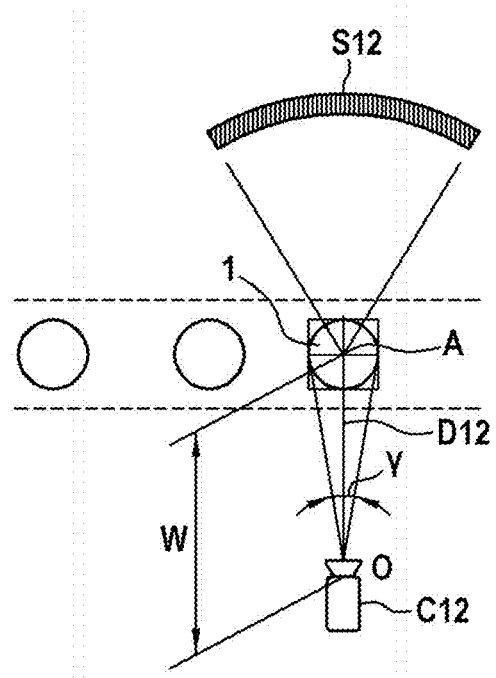

METHOD AND DEVICE FOR INSPECTING CONTAINERS MOVED ON A RECTILINEAR PATH

CROSS REFERENCE TO RELATED APPLICATIONS

This application is a 35 U.S.C. § 371 National Phase Entry Application from PCT/FR2022/051842, filed Sep. 29, 2022, designating the United States, and also claims the benefit of FR Application No. 2110358, filed Sep. 30, 2021, the disclosures of which are incorporated herein by reference in their entirety.

TECHNICAL FIELD

The present invention relates to the technical field of in-line inspection of transparent or translucent containers, such as glass bottles or flasks, in order to determine characteristics presented by such containers for their quality control.

The object of the invention finds particularly advantageous applications, but not exclusively for controlling or evaluating dimensional characteristics of the containers and/or for observing or analysing optical singularities on the surface or in the wall of a container, such as light absorbing and/or refracting and/or reflecting defects, affecting the quality of such containers.

PRIOR ART

In the prior art, it is known to automatically inspect, on the production line, containers passing at high speed in front of an optical control station comprising a vision system comprising a light source located on one side of the container and at least one camera located on the other side of the container. Using the light passing through the containers, the camera produces images of the containers which are analysed for determining dimensional characteristics of the containers or for detecting the presence of defects in the containers.

For example, patent FR 2 775 079 describes a machine for inspecting the walls and profiles of containers transported in-line by a conveyor. This machine comprises a first inspection station producing, by means of a camera and mirrors, two views at an angle of 60°, in other words two images of the containers in two observation directions having an angle of 60° between them. This machine also comprises a second inspection station, symmetric with the first station relative to the conveyor, and comprising a first camera carrying out an inspection of the wall at two views at an angle of 60° and a superposed second camera carrying out an inspection of the profile of the containers along two views at 60°. It is possible that, at the second station, a single camera successively performs the views for the inspection of the walls and for the analysis of profiles.

A controlled light source is associated with each view, comprising vertical rows of light-emitting diodes. A substantially curved or coiled diffuser intercepts the light coming from the two light sources of each inspection station, thus scattering the light and substantially removing the dark space between the two light sources.

This patent teaches detecting dimensional defects through analysis of the profiles, by measuring two diameters along two observation directions at 60°. However, since the planar section of a container is not circular, these two measurements cannot guarantee a good dimensional control of the containers.

For the aspect control, the side of the container located close to one edge of the panels of the light sources would appear dark, as can be seen in FIG. 3. It follows that the two sides of the container are not viewed in the same way. However, the shadows are regions in which the detection of defects such as bubbles or inclusions is difficult or even impossible to carry out. In other words, the detection sensitivity depends on the orientation of the container during its passage in the inspection stations. A defect will be seen differently, or even not seen at all, depending on whether it is located in the container close to the wall which is in the vicinity of the edge of the panel of the source, or close to the wall in the vicinity of the junction between the two sources, so that this solution cannot meet the quality inspection requirements.

Furthermore, this patent teaches carrying out the control of the profiles of the containers with narrow illuminated regions in order to obtain very marked shadows on the views.

Patent application EP3088873 describes a device for optical inspection of containers moved by a conveyor comprising, in accordance with an alternative illustrated in the drawings, a first inspection station equipped, on one side of the conveyor, with three angularly offset light source panels and, on the other side of the conveyor, with three cameras for which the observation directions are respectively centred on the three light source panels. The inspection device comprises a second inspection station which is symmetric with the first inspection station relative to the conveyor. The three light source panels can be considered as a single panel.

It should be noted that some panels can be planar in nature, but a panel is not necessarily planar but can be curved or formed from a plurality of segments oriented in a non-planar configuration relative to one another.

The panel comprises a plurality of light sources configured to illuminate the container. The light sources are individually controlled in order to individually adjust the intensity of each of the light sources. Thus, the camera can capture a uniform image without adjusting the placing or configuration of the light sources relative to the camera.

However, this device has the same disadvantage in that the two sides of the container are not able to be viewed in the same way. A defect will be seen differently, or even not seen at all, depending on whether it is located in the container close to the wall which is in the vicinity of the edge, or close to the wall which is in the vicinity of the junction between the two panels of the sources. Furthermore, this patent application indicates the possibility of increasing the number of cameras and panels of the source in order to increase the number of views of the containers. However, this results in an increase in the space requirement of such a device which makes its installation on a container production line practically prohibitive. According to this configuration, the number of panels fixes the number of possible views. With regard to dimensional control, according to the example with three panels in each inspection station, only three diameters are measured by means of views that are symmetrically opposite relative to the conveyor.

DISCLOSURE OF THE INVENTION

The object of the present invention aims to overcome the disadvantages of the prior art by proposing a method for inspecting containers moved along a rectilinear path, designed to guarantee an inspection quality of the containers while limiting the space requirement of the device implementing such an inspection technique.

Another object of the invention is to propose a method for inspecting containers moved along a rectilinear path, designed to obtain a same image rendering whatever the viewing angle around the container.

In order to attain such objectives, the method according to the invention relates to a method for inspecting containers moved in a conveying plane with a rectilinear path, the method consisting in, in a first inspection station:

providing a first light source illuminating the containers along a first side of the path, comprising an emitting surface having a plane of symmetry perpendicular to the path and extending, on the one hand, in height in a vertical direction normal to the conveying plane and, on the other hand, over a total angular width following a concave curve, the emitting surface being composed of a plurality of elementary light sources controlled so as to define at least three illumination zones having at least one first identical illumination configuration;

providing at least three image sensors with total observation fields and disposed with optical axes in different directions along a second side of the path opposite the first side, in order to each have, during an image acquisition of a container present in its total observation field, an observation direction passing through the optical centre and the central axis of the container, the observation directions for the at least three image sensors being different straight lines and adjusted to recover the light coming from an associated illumination zone;

and when a container in movement is successively located substantially centred on an observation direction of each of the image sensors, in order for each of said image sensors to acquire at least one image of the container illuminated by the associated illumination zone controlled to be switched on successively during the acquisition, having at least the first illumination configuration, the elementary light sources of the illumination zones being controlled in such a way that:

the at least three illumination zones associated with the image sensors have the at least three illumination zones associated with the image sensors extend with a symmetrical angular width relative to the corresponding observation direction;

and at least two angularly neighbouring illumination zones have a common illumination portion considering that said two illumination zones are not illuminated simultaneously.

According to a preferred alternative implementation, in a second inspection station located downstream of the first inspection station in the direction of movement of the containers, the method comprises:

providing a second light source illuminating the containers along the second side of the path, comprising an emitting surface having a plane of symmetry perpendicular to the path and extending, on the one hand, in height in a vertical direction normal to the conveying plane and, on the other hand, over a total angular width, following a concave curve, the emitting surface being composed of a plurality of elementary light sources controlled so as to define at least three illumination zones having at least one first identical illumination configuration;

providing at least three image sensors with total observation fields and disposed with optical axes in different directions along the first side of the path, in order to each have, during an image acquisition of a container present in its total observation field, an observation direction passing through the optical centre and the central axis of the container, the observation directions for the at least three image sensors being different straight lines and adjusted to recover the light coming from an associated illumination zone;

and when a container in movement is successively located substantially centred on an observation direction of each of the image sensors, in order for each of said image sensors to acquire at least one image of the container illuminated by the associated illumination zone controlled to be switched on successively during the acquisition, having at least the first illumination configuration, the elementary light sources of the illumination zones being controlled in such a way that:

the at least three illumination zones associated with the image sensors have the at least three illumination zones associated with the image sensors extend with a symmetrical angular width relative to the corresponding observation direction;

and at least two angularly neighbouring illumination zones have a common illumination portion considering that said two illumination zones are not illuminated simultaneously.

According to an alternative embodiment, the first light source and/or the second light source is provided with an emitting surface produced by a portion of a generalised cylinder created by a generatrix produced by a segment of vertical straight line and a concave directrix curve in the conveying plane, the concavity of which is turned towards the containers.

For example, the first light source and/or the second light source are each provided with an emitting surface having a total angular width between 10° and 175°.

Preferably, the first light source and/or the second light source are each provided with an emitting surface for which the directrix curve is an arc of a circle.

According to an alternative embodiment, the first light source and/or the second light source are provided with an emitting surface having, in the conveying plane, a width between 500 mm and 700 mm and a depth between 100 mm and 350 mm.

Typically, the first light source and/or the second light source are provided with an emitting surface embodied by a backlit one-piece diffuser.

According to an alternative implementation, in each inspection station:

at least three illumination zones are provided for the emitting surface of each light source, having at least the first identical illumination configuration, a second identical illumination configuration and a third identical illumination configuration;

and when a container is substantially centred on an observation direction of an image sensor, in order for each of said image sensors to successively acquire at least one image of the container illuminated by the associated illumination zone, having the first illumination configuration, at least one image of the container illuminated by the associated illumination zone, having the second illumination configuration and at least one image of the container illuminated by the associated illumination zone, having the third illumination configuration.

Typically, in each inspection station, at least three illumination zones are provided for the emitting surface of each light source, having:
- as a first identical illumination configuration, an extended configuration with suitable homogeneous pattern;
- as a second identical illumination configuration, a restricted homogeneous configuration;
- as a third identical illumination configuration, a structured configuration.

According to an exemplary implementation, at least three image sensors are provided in the first inspection station and at least three image sensors are provided in the second inspection station, said at least six image sensors having at least six observation directions spaced apart in pairs by at least 10°.

According to another exemplary implementation:
- in the first inspection station, at least three image sensors are provided having observation directions spaced apart in pairs by an angle of at least 30 degrees and preferably at least 40°;
- in the second inspection station, at least three image sensors are provided having observation directions spaced apart in pairs by an angle of at least 30 degrees and preferably at least 40°.

For example, the number and/or angular value of the observation directions of the image sensors relative to the direction of movement are modified by adjusting only the control of the first light source, and/or of the second light source, in order to have at least three illumination zones having at least one first illumination configuration.

According to another example, the number of observation directions of the image sensors is increased by adding image sensors.

Advantageously, at least one image sensor acquires at least two images of each container in at least two different observation directions, following the movement of the container in the total observation field of the image sensor.

By way of application examples, an analysis of the images taken by the image sensors with the same configuration of the illumination zones is carried out in order to derive information concerning defects and/or dimensions of the containers.

Thus, for example:
- the analysis of the six images taken by the at least six image sensors is carried out at at least one given height in the images scanned from the bottom of the container to the top, in order to determine the distance between two opposite edges of the container in order to derive a measurement of the diameter of the container at said height,
- the dimensional conformity of the container is determined on the basis of the measurements of at least six different diameters in six different directions compared with diameter tolerance thresholds or non-circularity thresholds for at least one given height of the container.

According to another advantageous feature, the method consists in providing, at one inspection station, at least three image sensors, having a substantially identical working distance at the time of acquisition of the images with a same illumination configuration.

According to another advantageous feature, the method consists in providing, in a first inspection station, at least three image sensors, and, in a second inspection station, at least three image sensors, each having a substantially identical working distance at the time of acquisition of the images with a same illumination configuration.

Another object of the invention is to propose a device for inspecting containers moved in a conveying plane with a rectilinear path, this inspection device comprising:
- a first inspection station comprising:
- a first light source along a first side of the path, comprising an emitting surface having a plane of symmetry perpendicular to the path and extending on the one hand, in height in a vertical direction normal to the conveying plane and on the other hand, over a total angular width following a concave curve, the emitting surface being composed of a plurality of elementary light sources controlled so as to define at least three illumination zones having at least one first identical illumination configuration;
- at least three image sensors with total observation fields and disposed with optical axes in different directions along a second side of the path opposite the first side, in order to each have, during an image acquisition of a container present in its total observation field, an observation direction passing through the optical centre and the central axis of the container, the observation directions for the image sensors being different and adjusted to recover the light coming from an associated illumination zone;
- a second inspection station located downstream of the first inspection station in the direction of movement of the containers, this second inspection station comprising:
- a second light source along the second side of the path, comprising an emitting surface having a plane of symmetry perpendicular to the path and extending, on the one hand, in height in a vertical direction normal to the conveying plane and, on the other hand, over a total angular width following a concave curve, the emitting surface being composed of a plurality of elementary light sources controlled so as to define at least three illumination zones having at least one first identical illumination configuration;
- at least three image sensors with total observation fields and disposed with optical axes in different directions along the first side of the path, in order to each have, during an image acquisition of a container present in its total observation field, an observation direction passing through the optical centre and the central axis of the container, the observation directions for the image sensors being adjusted to recover the light coming from an associated illumination zone, the observation directions for the image sensors of the second inspection station being mutually different straight lines and different from the observation directions of the image sensors of the first inspection station;
- and a control system of the light sources and the image sensors configured so that when a container in movement is successively located substantially centred on an observation direction of each of the image sensors, in order for each of said image sensors to acquire at least one image of the container illuminated by the associated illumination zone controlled to be switched on successively during the acquisition, having at least the first illumination configuration, the elementary light sources of the illumination zones being controlled in such a way that:
- the at least three illumination zones of each inspection station associated with the image sensors have identical angular widths;

the at least three illumination zones of each inspection station associated with the image sensors extend with a symmetrical angular width relative to the corresponding observation direction;

and at least two angularly neighbouring illumination zones of each inspection station have a common illumination portion considering that said two illumination zones are not illuminated simultaneously.

According to an embodiment feature, the at least three image sensors of each inspection station have observation directions which are straight lines spaced apart in pairs by an angle of at least 30° and preferably at least 40°.

Advantageously, the at least three image sensors of the first station and the at least three image sensors of the second inspection station have at least six observation directions spaced apart in pairs by at least 10°.

Typically, the first light source and/or the second light source has an emitting surface having, in the conveying plane, a width between 500 mm and 700 mm and a depth between 100 mm and 350 mm.

Moreover, the first light source and the second light source are advantageously positioned so that the emitting surfaces of the light sources have a space requirement between 1000 mm and 1400 mm.

According to a preferred exemplary implementation, the emitting surface of the first light source and/or of the second light source is embodied by a backlit one-piece diffuser.

According to an advantageous embodiment feature, at least three image sensors, in one inspection station, each have a substantially identical working distance taken along the optical axis between their optical centre and the path of the containers.

According to another advantageous embodiment feature, at least three image sensors in a first inspection station and at least three image sensors in a second inspection station each have a substantially identical working distance taken along the optical axis between their optical centre and the path of the containers.

BRIEF DESCRIPTION OF THE DRAWINGS

FIG. 1 is a schematic perspective view showing an exemplary embodiment of a device for inspecting containers moved in translation.

FIG. 2 is a schematic view from above showing an exemplary embodiment of an inspection device according to the invention.

FIG. 3 is a schematic view showing, in the horizontal plane, the illumination zones of the emitting surfaces and the fields of observation of the image sensors of the inspection device according to the invention.

FIG. 3A is a schematic view showing, in the horizontal plane, a first illumination zone of the emitting surface of the first inspection station and the field of observation of a first image sensor encountered during the movement of a container.

FIG. 3B is a schematic view showing, in the horizontal plane, a second illumination zone of the emitting surface of the first inspection station and the field of observation of a second image sensor encountered during the movement of a container.

FIG. 3C is a schematic view showing, in the horizontal plane, a third illumination zone of the emitting surface of the first inspection station and the field of observation of a third image sensor encountered during the movement of a container.

FIG. 4A is a diagram schematically representing the illumination produced when a mass diffuser is separated into two distinct bodies.

FIG. 4B is a diagram schematically representing the illumination produced when a mass diffuser consists of a continuous diffuser.

FIG. 4C is a diagram schematically representing the illumination produced when a surface diffuser is separated into two distinct bodies.

FIG. 4D is a diagram schematically representing the illumination produced when a surface diffuser consists of a continuous diffuser.

FIG. 5A shows two views of containers taken by two neighbouring cameras, according to the invention.

FIG. 5B shows two views of containers taken by two neighbouring cameras with a planar light source parallel to the path of the containers or with a light source edge close to the right side of the container.

FIG. 6A is a schematic view showing, in the horizontal plane, the position of six image sensors symmetrically disposed with respect to the two inspection stations and on either side of the path of the containers.

FIG. 6B is a schematic view showing, in the horizontal plane, the position of three different diameters of a container viewed by the six image sensors illustrated in FIG. 6A.

FIG. 7A is a schematic view showing, in the horizontal plane, the position of six image sensors disposed non-symmetrically with respect to the two inspection stations and on either side of the path of the containers.

FIG. 7B is a schematic view showing, in the horizontal plane, the position of six different diameters of a container viewed by the six image sensors illustrated in FIG. 7A.

FIG. 8A is a schematic view showing, in the horizontal plane, the position of seven image sensors disposed non-symmetrically with respect to the two inspection stations and on either side of the path of the containers.

FIG. 8B is a schematic view showing, in the horizontal plane, the position of seven different diameters of a container viewed by the seven image sensors illustrated in FIG. 8A.

FIG. 9A is a schematic view showing, in the horizontal plane, a so-called restricted homogeneous illumination configuration, for an associated illumination zone of an image sensor.

FIG. 9B is a schematic view showing, in the horizontal plane, a so-called homogeneous extended illumination configuration, suitable for an associated illumination zone of an image sensor.

FIG. 9C is a schematic view showing, in the horizontal plane, the so-called structured illumination configuration, for an illumination zone associated with an image sensor.

FIG. 10 is a schematic view showing, in the horizontal plane, an elliptical configuration of the emitting surface of a light source.

FIG. 11 is a schematic view showing, in the horizontal plane, the angles γ of the light rays coming from the container relative to the observation direction of an image sensor.

DESCRIPTION OF THE EMBODIMENTS

As can be seen from the figures, in particular FIGS. 1 and 2, the object of the invention concerns a device I and a method for in-line inspecting of containers 1 made of transparent or translucent material, such as glass containers, in particular when empty. These containers are inspected using image sensors recovering light that has, in particular, passed through the containers and coming from light sources. The images taken by the analogue or digital image sensors are analysed for ensuring quality control for, in particular, controlling or evaluating the dimensional features of the containers and/or for observing or analysing optical singularities at the surface or in the wall of a container. The digital images are analysed by a computer calculation unit of any possible architecture, composed of processors (CPU, GPU and/or FPGA) and memories, distributed across a plurality of computers, and entry, display and communication means. The term optical singularities designates limited portions of a container or its surface having different properties from those of their vicinity, on or in the container. Therefore, the term optical singularities designates portions of a container having different optical properties from those of their vicinity, on or in the container. In this case, these optical singularities are mainly an abnormal effect of transmission, refraction, modification of the state of polarisation and/or reflection, relative to their vicinity. The refracting and/or reflecting defects, the codes or even emblem type decorations marked on the surface of the containers are therefore optical singularities which deflect light in a different manner relative to their vicinity, either in transmission (dioptres) or in reflection. Dirt or certain foreign bodies or regions of abnormal thickness are therefore optical singularities which absorb light in a different manner relative to their vicinity. Certain foreign bodies creating stress are therefore optical singularities which change the polarisation state of light in different ways relative to their vicinity. The object of the invention thus makes it possible, in particular, to detect potential defects absorbing and/or refracting and/or reflecting light, affecting the quality of such containers.

The device I comprises at least one first inspection station I1 in which the containers 1 are caused to pass by in a line in a direction of movement F, using a transport system II of any type known per se. According to an illustrated alternative embodiment, the device I also comprises a second inspection station I2 located downstream of the first inspection station I1 in the direction of movement F of the containers. Of course, the device I can comprise a single inspection station.

In general, a container 1 has a central axis A, considered as an axis of symmetry, or even an axis of rotational symmetry. Thus, a container 1 has a glass wall forming, from bottom to top along the central axis A, a bottom connected to a heel from which a body rises, extended by a shoulder connected to a neck or bottleneck, terminated by a ring delimiting the mouth enabling the container to be filled or emptied.

The central axis A is considered as an axis of symmetry for containers with a round cross-section, considering a perfectly uniform and ideal distribution of glass relative to the design plane of the container. Obviously, real containers are not strictly symmetrical. The distribution of glass is somewhat heterogeneous. Some containers have relief decorations or ring threads, etc. Finally many models of containers, referred to as "shaped articles", have a non-round cross-section. In the majority of cases, even for shaped articles, the central axis A corresponds to an axis orthogonal to the plane defining the bottom of the container and parallel to the conveying plane Pc of the containers.

In at least each of the inspection stations of the device I, the containers 1 are transported in a horizontal conveying plane Pc using the transport system II of any known type per se. It should be noted that on production lines according to the illustrated example, upstream and downstream of the various inspection stations I1, I2, the containers 1 are transported by their bottom resting on pallet or chain conveyors. The surface of the chain defines the generally horizontal conveying plane. The containers are sometimes brought into the inspection stations I1, I2 by so-called input conveyors then redeposited after inspection on a so-called output conveyor, the input and output conveyors generally having the same conveying plane. This conveying plane is very generally horizontal, and during the conveying, the central axis of the containers resting on their bottom remains vertical. The transport system II is of all known types, provided that the containers are made to circulate between a light source and an image sensor and that a portion of the wall to be inspected is cleared in order to enable the passage of light from the light source towards the container and then towards the image sensors.

In the present application, the direction of movement F of the containers 1 is established along a rectilinear path with horizontal axis X of an orthogonal frame of reference X, Y, Z, comprising a vertical axis Z perpendicular to the horizontal axis X and a transverse axis Y perpendicular to the vertical axis Z and to the horizontal axis X, and the axes X and Y being in a plane parallel to a conveying plane Pc of the containers, which is horizontal. The containers 1 are thus driven only in a rectilinear translation, without any rotational movement around themselves.

In accordance with the invention, the first inspection station I1 comprises a first light source L1 disposed along a first side of the path of axis X of the containers, as can be seen in FIGS. 2 and 3. This first light source L1 comprises an emitting surface S1 having a plane of symmetry P1 perpendicular to the path of axis X of the containers. This emitting surface S1 extends in height in a vertical direction of axis Z normal to the conveying plane Pc. This emitting surface S1 also extends over a total angular width in a plane with axes X, Y parallel to the conveying plane Pc, following a concave curve, the concavity of which is turned towards the transport system II. This total angular width is measured in the conveying plane at a point M located on the path of the central axis A of the containers.

According to the exemplary embodiment illustrated in the drawings, the device I also comprises a second inspection station I2 comprising a second light source L2 disposed along the second side of the path of axis X of the containers, in other words along the side opposite that intended for the first light source L1, as can be seen in FIGS. 2 and 3. This second light source L2 comprises an emitting surface S2 having a plane of symmetry P2 perpendicular to the path of axis X of the containers. This emitting surface S2 extends in height in a vertical direction of axis Z normal to the conveying plane Pc. This emitting surface S2 also extends in total angular width in a plane with axes X, Y parallel to the conveying plane Pc following a concave curve, the concavity of which is turned towards the transport system II. This total angular width is measured in the conveying plane at a point M located on the path of the central axis A of the containers.

It should be considered that the emitting surfaces S1 and S2 of the first L1 and second L2 light sources can have different shapes. It should be noted that the emitting surfaces S1 and S2 of the first L1 and second L2 light sources have identical or different shapes. According to an alternative embodiment, the first light source L1 and/or the second light source L2 have an emitting surface S1, S2 produced by a portion of a generalised cylinder created by a generatrix produced by a segment of vertical straight line of axis Z and a concave directrix curve in the conveying plane Pc, the concavity of which is turned towards the transport system II.

Typically, the emitting surface S1, S2 is embodied by a portion of a cylinder with a directrix curve approximated by segments, the angles between the connected segments being greater than 160°, and/or the segments being connected by edges of suitable radius of curvature (for example greater than 5 mm) so as not to create a horizontal variation in luminance of the surface. A smooth, preferably regular, curve will be preferred to a curve approximated by segments, as directrix curve. The emitting surface S1, S2 of the first light source and/or of the second light source can thus have the shape of a cycloid portion or an elliptical portion, as illustrated in FIG. 10. According to an alternative embodiment, the directrix curve of the emitting surface of the first light source and/or of the second light source is an arc of a circle.

Advantageously, the first light source L1 and/or the second light source L2 has an emitting surface S1, S2 with a total angular width between 100° and 175°, this total angular width being measured in the plane with axes X and Y, following the curve of the emitting surface, and measured in the conveying plane at a point M located on the path of the central axis A of the containers. According to a preferred exemplary embodiment, the first light source L1 and/or the second light source L2 has an emitting surface S1, S2 for which the directrix curve is an arc of a circle.

According to an alternative embodiment, the first light source L1 and/or the second light source L2 has an emitting surface S1, S2 having, in the conveying plane Pc, a width I taken along the axis X of between 500 mm and 700 mm and a depth p taken along the axis Y of between 100 mm and 350 mm. Similarly, the first light source L1 and/or the second light source L2 has an emitting surface S1, S2 having for example, a height taken along the axis Z of between 20 mm and 800 mm. Advantageously, the first light source L1 and the second light source L2 are positioned so that the emitting surfaces S1, S2 of the light sources have a space requirement L taken along the axis X, of between 1000 mm and 1400 mm. For example, the emitting surfaces S1, S2 of the light sources are positioned so as to be substantially contiguous along the path of horizontal axis X.

According to a feature of the invention, each emitting surface S1, S2 is composed of a plurality of elementary light sources controlled to be switched on/off so as to respectively define at least three illumination zones S11, S12, S13 and S21, S22, S23, having at least one first identical illumination configuration. It should be understood that an elementary light source corresponds to an elementary portion of the emitting surface S1, S2. These elementary light sources can be produced in any appropriate manner. For example, each elementary light source comprises a primary elementary source Sf illuminating, by back-lighting, a light-emitting surface element. In this exemplary embodiment, each primary elementary source Sf consists of a light-emitting diode having a PN junction for emitting light radiation in a determined emission spectral band. According to another exemplary embodiment, each primary elementary source Sf consists of a light-emitting diode having a plurality of PN junction or juxtaposed blocks emitting light radiation in various emission spectral bands. Of course, each block of the light-emitting diodes is controlled electronically to be switched on/off. According to another exemplary embodiment, each primary elementary source Sf comprises a plurality of light-emitting diodes controlled together.

According to a preferred alternative embodiment, the emitting surface S1, S2 of the first light source and/or of the second light source is embodied by a one-piece backlit diffuser dif. In other words, the emitting surface S1, S2 is that of a continuous, mass or surface, coloured or non-coloured diffuser, suitable for transmitting the visible and/or near infrared spectrum of light. A mass diffuser dif is a diffuser of a certain thickness, for example a white and/or translucent polyacrylate plate that is bent by thermoforming, the diffusion taking place in its mass of thickness, for example, 2 mm. A surface diffuser having, on at least one side, a surface state of particular granularity, scattering the light passing through this surface, is produced for example by means of a frosted or moulded transparent polyacrylate plate, then bent by thermoforming in order to take the curvature of the directrix curve, or by means of a flexible thin film curved during assembly. It is possible to superpose a plurality of diffusers and to combine them with coloured or polarising filters. In this way, the light E emitted by the region of the emitting surface S1, S2 constituted by the diffuser backlit by at least two different contiguous primary elementary sources Sf is uniform without shadow, as illustrated in FIG. 4B for a mass diffuser dif and FIG. 4D for a surface diffuser dif. By contrast, FIG. 4A for a mass diffuser and FIG. 4C for a surface diffuser show the case where two different diffusers dif1, dif2 are juxtaposed. According to these two examples, the diffusion being interrupted by the edges bdif of the two diffusers dif1, dif2, the border would present a lighting anomaly Ed visible on the perceived light profiles E. The continuity of material or surface of the diffuser dif therefore results in a continuity of illumination without interruption on any region of the emitting surface S1, S2. For example, it is possible to display the same illumination pattern anywhere on the emitting surface S1, S2. It is also possible to successively shift, from top to bottom and/or from right to left, over the entire emitting surface S1 S2, an illumination pattern with a pitch, or more precisely an elementary shift, corresponding to the dimension of the elementary sources, the pattern remaining constant without shadow or interruption.

The continuous diffuser dif is disposed in front of the primary elementary sources Sf relative to the transport system II. Thus, the emitting surface S1, S2 is that of a diffuser that is backlit by the primary elementary sources Sf carried by one or more printed circuits. For example, the primary elementary sources Sf are carried by a flexible printed circuit shaped according to the concave directrix curve or by at least three planar printed circuits forming a polyhedron in the illustrated example (FIG. 1). Similarly, the elementary light sources are portions of the surface of a diffuser backlit by the light-emitting diodes carried by one or more printed circuits and constituting all of the primary elementary sources Sf.

It should be remembered that, by means of the electronic control of the primary elementary sources Sf, the elementary light sources are controlled independently from one another for switching on/off so as to define for each inspection station, at least three illumination zones S11, S12, S13 and S21, S22, S23 respectively, all having at least one first identical illumination configuration. An illumination zone corresponds to a region of the emitting surface S1, S2 containing a determined assembly of elementary light sources that are simultaneously controlled for switching on. Each illumination zone is delimited by a framing contour, extending along the vertical axis Z and a concave curve of angular illumination width established in the plane with axes X, Y. Each illumination zone S11, S12, S13, S21, S22, S23 therefore has an angular illumination width L11, L12, L13, L21, L22, L23 respectively, taken in the plane with axes X, Y, the angle being measured by the angle of two concurrent straight lines on the central axis A of the container and respectively the two lateral edges of the illumination zone, as appears in the figures. The angular illumination width is therefore the angle over which the light is received by the container. The angular width of an illumination zone is the angular width of a vertical-horizontal rectangle framing all the elementary light sources illuminated together in the same illumination zone. All of the elementary light sources illuminated together in the same illumination zone can therefore have a non-rectangular contour, for example a contour running along, with a given margin, the silhouette of a container for an observation direction and an associated image sensor.

An illumination zone $S11$, $S12$, $S13$ and $S21$, $S22$, $S23$ has a corresponding illumination pattern corresponding to the spatial distribution of luminous intensities generated by the various elementary light sources belonging to said illumination zone. It is also possible that other properties of the light, such as the colour, polarisation or temporal phase have various spatial distributions in an illumination zone. The illumination pattern of the illumination zones is adjusted to the type of quality control to be performed, namely the evaluation of the dimensional characteristics of the containers or the detection of defects absorbing, refracting and/or reflecting the light or modifying its polarisation state and affecting the quality of such containers.

The illumination pattern of the illumination zones can take various known configurations. A first illumination configuration is referred to as extended with adjusted homogeneous pattern. In this illumination configuration, the illuminated region is extended relative to the silhouette of the container, in particular the angular illumination width is such that from the point of view of the camera, the illuminated region largely encompasses the silhouette of the container. The angular illumination width can be such that the edges of the illuminated region are outside the useful field of the camera. The adjusted homogeneous pattern is such that the spatial distribution of the luminous intensities generated is homogeneous inside a rectangular or non-rectangular contour of the illumination zone. This spatial distribution has no sudden variations and is adjusted such that some regions generate a higher intensity of light than other regions, to pass through the more absorbent regions of containers made of tinted glass, for example thicker regions, such as the neck. The aim of this illumination configuration without strong local variation in intensity is to provide images which easily reveal the absorbent defects. Being extended, it creates narrow shadows on the walls, enlarging the detection region and improving the overlap between the various observations.

A second illumination configuration is referred to as restricted homogeneous. In this second illumination configuration, the illuminated region is restricted in dimensions, thus its angular width is narrow so as to closely follow the silhouette of the container from the point of view of the camera, its contour may or may not be rectangular, and the pattern, such as the generated spatial distribution of the luminous intensities, is homogeneous around the silhouette of the container without sudden variation vertically. The adjustment to the transmission is not necessary because the aim of this second illumination configuration is to supply the images for the dimensional control based on detection, in the images, of the contours or the silhouette of the container, without considering the interior of the silhouette. It is even possible that the interior of this zone comprises a dark or black portion, but the background of the contours of the container wall is homogeneous. Being narrow, it creates very black shadows at the walls, that is to say marked shadows, contrasting relative to the background, and which extend towards the interior of the silhouette.

A third illumination configuration, referred to as structured, is generally extended relative to the silhouette of the container, and its illumination pattern is referred to as structured or test-pattern type. Structured or test-pattern illumination pattern shall mean a spatial variation function in the illumination zone, of at least one property of the light. The spatially variable property is generally the luminous intensity. Alternatively, the spatially variable property is the wavelength spectrum (colour) or even a polarisation property such as the direction of polarisation, the direction of circular polarisation or the degree of polarisation. According to another alternative, the spatially variable property is the shape or phase of a periodic temporal variation of a property of the light, such as its intensity, the state of polarisation or the emission spectrum. When the pattern is non-uniform and therefore the illumination zone has a structured or test-pattern illumination pattern, the variation can be of any type such as a gradient, a triangle, a succession of gradients, continuous, discontinuous, cyclical or non-cyclical, fast or slow, vertical or oblique, etc. In general, a test-pattern with periodic variation is preferably used. The spatial variation function can be bidirectional, such as when the targeted or test-pattern illumination pattern takes the form of a checkerboard. The spatial distribution of the luminous intensities generated has rather rapid variations, in such a way as to contrast the defects which deviate the light, thus refracting defects which will transmit light with the variable property different from that transmitted by their vicinity.

A person skilled in the art will recognise that according to the invention, an illumination zone can have any illumination configuration, dimension, intensity distribution or variation of any property of the light for different detection methods based on different types of images obtained.

According to an alternative embodiment, the illumination zones have:

- as a first identical illumination configuration, the so-called extended configuration with adjusted homogeneous pattern. This first illumination configuration is adjusted, in particular, to detect defects with an absorbing or refracting also called stress aspect;
- as a second identical illumination configuration, the so-called restricted homogeneous configuration. The luminous lighting zone is uniform inside a closed contour of angular width less than 40% of the angular width of the first identical configuration, by considering that the inside of this zone can comprise a dark part, but with the background of the contours of the wall of the container which is homogeneous. This illumination configuration which has a reduced illumination width relative to the first configuration, is particularly suitable for a dimensional control of the containers, by producing suitable shadows on the images at the location of the contours of the containers;
- as a third identical illumination configuration, the so-called structured configuration. This third illumination configuration is suitable, in particular, for detecting refracting defects such as folds, bubbles or reliefs such as decorative engravings, positioning pins or identification codes.

The term identical illumination configuration should be understood to mean that all the illumination zones $S11$, $S12$, $S13$ and $S21$, $S22$, $S23$ have an identical illumination pattern. In other words, each container 1 passing through the inspection stations I1, I2 is illuminated in the same manner for said image taking, at least once by this illumination pattern.

The inspection device comprises a control system 10 enabling control of the switching on/off of the elementary light sources. The control system 10 of any known type controls the elementary light sources in order that it delivers a quantity of light during the taking of the images. Thus, according to the exemplary embodiment, this control system 10 controls the primary elementary sources Sf through the duration of switching on and/or the current and/or the voltage and/or a duty cycle and/or a modulation frequency and/or a temporal phase shift. As explained above, this control system 10 controls the elementary light sources so as to define, for each emitting surface S1, S2, at least three illumination zones having at least one first identical illumination configuration.

According to another feature of the invention, the first inspection station I1 comprises at least three image sensors C11, C12, C13 disposed along the second side of the path opposite the first side in which the first light source L1 is positioned. The image sensors C11, C12, C13 are optical image acquisition systems, each comprising a camera of all known types and at least one lens with an optical centre. Conventionally, each image sensor C11, C12, C13 has a respective optical axis A11, A12, A13, an optical centre O, a total observation field, and a working distance W between the optical centre O and the focusing plane. The three image sensors C11, C12, C13 are disposed with optical axes in different directions along the second side of the path, opposite the first side, in order to take the images of the containers entering into their total observation field during the movement of the containers.

Although the focusing can be on the front face of the containers, in general the in-focus plane is such that both sides of the container are in focus in the images, and the in-focus plane corresponds approximately to the central axis A of the containers. In the remainder of the description, the working distance W is defined as the distance between the optical centre O of the image sensor and the central axis A of the container at the time of the image acquisition, as is illustrated in FIG. 11.

The acquired image comprises an entire or partial image of the container. This image corresponds to a useful field of observation. The acquired image can optionally, but not necessarily, have the maximum dimension permitted by the optoelectronic sensor and the focal length of the lens. Thus, the useful field of observation can cover the total observation field. The total field of each camera is therefore greater than or equal to the useful field of observation. FIGS. 9A, 9B, 9C show the total observation field of the camera C12 as comprised in a total field angle α. It is observed that the useful field is any field provided that it enables the image of the container to be produced or a part of the container to be inspected. Thus, it would be possible that the useful field is equal to the total field each time. It is alternatively possible that the image sensors only transmit digital images covering a minimum useful field in order to reduce the quantity of data transmitted to the computer calculation unit.

During an image acquisition of a container present in its total observation field, each image sensor C11, C12, C13 has an observation direction D11, D12, D13 passing through the optical centre O and the central axis A of the container 1. This observation direction thus corresponds to the segment of the straight line connecting the optical centre O of the lens of the camera to the central axis A of the container 1, projected, in the horizontal plane with axes X and Y. Each image sensor C11, C12, C13 has a determined angle of observation δ corresponding to the angle of the observation direction D11, D12, D13 relative to the direction of passage F projected onto the horizontal plane with axes X and Y. The working distance W of each image sensor is the length of the segment connecting the optical centre O of the lens of the camera to the central axis A of the container 1.

In the present description, for reasons of clarity of the disclosure, the observation directions of the image sensors are projected, in the horizontal plane with axes X and Y, because there is no interest in the angle of the observation directions relative to the conveying plane Pc, in other words the image sensors can observe the containers, or have observation directions either from a high angle or a low angle for the invention. Similarly, the inter-direction angles β are defined between two observation directions, in the horizontal plane with axes X and Y. By convention, the angle of observation δ is the angle measured in the horizontal plane with axes X and Y in the trigonometric sense, of an observation direction relative to the direction of passage F, in other words it corresponds to the angle between the axis X and the segment of the horizontal straight line connecting the optical centre of the lens of the camera to the central axis A of the container 1. Similarly the working distances of the image sensors can be considered, in the horizontal plane with axes X and Y.

Furthermore, the observation directions D11, D12, D13 for the at least three image sensors of the first inspection station I1 are different straight lines from one another, with an intermediate direction angle in pairs β, and adjusted to recover the light coming from an associated illumination zone S11, S12, S13. In other words, each image sensor C11, C12, C13 of the first inspection station I1 is adjusted to recover the light coming from an associated illumination zone S11, S12, S13 respectively, as can be clearly seen in FIGS. 3A to 3C. Thus, each image sensor C11, C12, C13 and each associated illumination zone S11, S12, S13 respectively, are adjusted in pairs at the time of the image acquisitions in the observation directions D11, D12, D13.

According to another feature of the invention, the second inspection station I2 comprises at least three image sensors C21, C22, C23 disposed along the first side of the path opposite the second side in which the second light source L2 is positioned. The image sensors C21, C22, C23 are optical image acquisition systems, each comprising a camera of all known types and at least one lens with an optical centre O. Conventionally, each image sensor C21, C22, C23 of the second inspection station has a respective optical axis A11, A12, A13, an optical centre O, a total observation field, and a working distance W between the optical centre O and the focusing plane. The three image sensors C21, C22, C23 are disposed with optical axes in different directions along the first side of the path opposite the second side, in order to take the images of the containers entering into their total observation field during the movement of the containers.

As indicated previously, the working distance W is the distance between the optical centre O of the image sensor and the central axis A of the container at the time of the image acquisition. Similarly, the total observation field of a camera is included in a total field angle α. The total field of each camera is greater than or equal to the useful field of observation making it possible to produce the image of the container or of a part of the container to be inspected.

During an image acquisition of a container present in its total observation field, each image sensor C21, C22, C23 has an observation direction D21, D22, D23 passing through the optical centre O and the central axis A of the container 1.

This observation direction thus corresponds to the segment of the straight line connecting the optical centre O of the lens of the camera and the central axis A of the container 1, projected, in the horizontal plane with axes X and Y. Each image sensor C21, C22, C23 has a determined angle of observation δ corresponding to the angle of the observation direction D21, D22, D23 relative to the direction of passage F projected onto the horizontal plane with axes X and Y. The working distance W of each image sensor is the length of the segment connecting the optical centre O of the lens to the central axis A of the container 1.

Furthermore, the observation directions D21, D22, D23 for the at least three image sensors of the second inspection station I2 are straight lines different from one another, with an intermediate direction angle in pairs β, and adjusted to recover the light coming from an associated illumination zone S21, S22, S23. In other words, each image sensor C21, C22, C23 of the second inspection station I2 is adjusted to recover the light coming from an associated illumination zone S21, S22, S23. Thus, each image sensor C21, C22, C23 and each associated illumination zone S21, S22, S23 respectively, are adjusted in pairs at the time of the image acquisitions in the observation directions D21, D22, D23.

According to an alternative embodiment, the at least three image sensors C11, C12, C13 of the first inspection station I1 and the at least three image sensors C21, C22, C23 of the second inspection station I2 have at least six observation directions D11, D12, D13, D21, D22, D23 spaced apart in pairs by at least 10°. It should be understood that at the two inspection stations, the observation directions of the image sensors all have a different angular value relative to the path F of direction X. It is thus possible to provide, for each container, at least six images in six different observation directions, which is particularly advantageous for measuring the diameters and the ovality of a section of the container. According to an alternative embodiment illustrated in FIG. 7A, the six observation directions D11, D12, D13, D21, D22, D23 have the following values of angle of observation δ: 35°, 95°, 145°, 225°, 265°, 315°.

According to another alternative embodiment, the at least three image sensors C11, C12, C13 of the first inspection station I1 have observation directions spaced apart in pairs by and angle β of at least 30° degrees and preferably by an angle β of at least 40°, while the at least three image sensors C21, C22, C23 of the second inspection station I2 have observation directions spaced apart in pairs by an angle β of at least 30 degrees and preferably an angle β of at least 40°. Typically, in the example illustrated in FIG. 6A, the observation directions D11, D12, D13, D21, D22, D23 have the following values: 40°, 90°, 140°, 220°, 270°, 320°. Thus, in each inspection station, the image sensors have nearest-neighbour observation directions in pairs with an angle β of 50°.

The image sensors C11, C12, C13 of the first inspection station I1 and the image sensors C21, C22, C23 of the second inspection station I2 are controlled by the control system 10 in order to take the images of the containers 1 during their movement in translation in front of the inspection stations. To this effect, the control system 10 is configured in order, when a container 1 in movement is successively located substantially centred on a observation direction D11, D12, D13, D21, D22, D23 of each of the image sensors C11, C12, C13, C21, C22, C23, to acquire by each of said image sensors, at least one image of the container illuminated by the associated illumination zone S11, S12, S13, S21, S22, S23 controlled to be switched on successively during the acquisition and having at least the first illumination configuration.

In accordance with a feature of the invention, the elementary light sources of the illumination zones S11, S12, S13, S21, S22, S23 are controlled by the control system 10 such that:

the at least three illumination zones of each inspection station associated with the image sensors have identical angular widths;

the at least three illumination zones S11, S12, S13, S21, S22, S23 of each inspection station I1, I2 associated with the image sensors extend with a symmetric angular width L11, L12, L13; L21, L22, L23 relative to the corresponding observation direction D11, D12, D13, D21, D22, D23;

and at least two angularly neighbouring illumination zones S11-S12; S12-S13; S21-S22; S22-S23 of each inspection station, have a common illumination portion S112, S113, S212, S213 considering that said two illumination zones are not simultaneously illuminated.

It is clear from the preceding description that the device I complies with the invention and can implement a method for in-line inspection of empty glass containers 1, for ensuring quality control of these containers. Such a method aims to provide a first inspection station I1 as described above and, advantageously, a second inspection station I2 described above. The transport system II causes the containers 1 to pass successively in front of each of the image sensors of the two inspection stations. Thus, the central axis A of each container 1 is caused to successively cut the observation directions of each image sensor.

This can be seen more precisely in FIG. 3A, when a container 1 arrives in a position where it is located substantially centred on the observation direction D11 of the first image sensor C11 and positioned on the path, the control device 10 controls, on the one hand, by switching on, according to at least one first illumination configuration, the elementary light sources of the illumination zone S11 associated with the first image sensor C11 and, on the other hand, the first image sensor C11 so as to acquire, by this first image sensor C11, at least one image of the container illuminated by the associated illumination zone S11. In this case, the useful field of observation contains the container or at least one portion of the container to be inspected. In accordance with the invention, the elementary light sources of the illumination zone S11 are controlled so that the illumination zone S11 has an identical angular width L11 to the other angular widths of the illumination zones of the inspection stations which will be controlled to be switched on in order to illuminate the container passing in front of the other image sensors. Thus, each container 1 is illuminated identically for all of the images taken by the image sensors of the inspection stations.

In accordance with the invention, the elementary light sources of the illumination zone S11 are also controlled such that the illumination zone S11 associated with the first image sensor C11 extends with a symmetric angular width L11 relative to the observation direction D11 of this first image sensor C11. In other words, as shown in FIG. 3A, the angular width L11 is divided by the observation direction into two equal angular sectors. It is thus possible to obtain a same width of the shadows on the right and left edges of the images of the containers appearing on the images taken. The ratio between the angular width L11 and the apparent diameter of the bottle is to be determined according to the containers to be inspected, the type of control etc. Moreover, the useful field of observation may or may not include the edge of the illumination zone.

In accordance with the invention, the elementary light sources controlled in order to produce the illumination zone S11 are also controlled in order to produce the angularly neighbouring illumination zone, namely the illumination zone S12, such that the illumination zone S12 has a common illumination portion S112 with the illumination zone S11, considering that said two illumination zones S11, S12 are not illuminated simultaneously. In other words, the elementary light sources of this common illumination portion S112 which are controlled to be switched on during the image taking by the first image sensor C11 will also be controlled to be switched on during the image taking by the second image sensor C12. The overlap between the adjacent illumination zones makes it possible a gain in space requirement while guaranteeing the same illumination conditions during the taking of views. Typically, the angular width of the common illumination portion S112 is for example between 8° and 24°.

When the container 1 arrives in a position where it is located substantially centred on the observation direction D12 of the second image sensor C12 and positioned on the path (FIG. 3B), the control device 10 controls, on the one hand, by switching on, according to at least the first illumination configuration, the elementary light sources of the illumination zone S12 associated with the second image sensor C12 and, on the other hand, the second image sensor C12 so as to acquire by this second image sensor C12, at least one image of the container illuminated by the associated illumination zone S12. In accordance with the invention, the elementary light sources of the illumination zone S12 are controlled such that the illumination zone S12 has an identical angular width L12 to the angular width of the illumination zone S11 associated with the first image sensor C11.

In accordance with the invention, the elementary light sources of the illumination zone S12 are also controlled such that the illumination zone S12 associated with the second image sensor C12 extends with a symmetric angular width L12 relative to the observation direction D12 of this second image sensor C12. Thus, as shown in FIG. 3B, the angular width L11 is divided by the observation direction into two equal angular sectors.

In accordance with the invention, the elementary light sources of the illumination zone S12 are also controlled so that this illumination zone S12 and the angularly neighbouring illumination zone, namely the illumination zone S11, have a common illumination portion S112 as explained above. Thus, the elementary light sources of this common illumination portion S112 are controlled to be switched on at the same time as the other elementary sources forming the remainder of the illumination zone S12.

When the container 1 arrives in a position where it is located substantially centred on the observation direction D13 of the third image sensor C13 and positioned on the path (FIG. 3C), the control device 10 controls, on the one hand, by switching on, according to at least the first illumination configuration, the elementary light sources of the illumination zone S13 associated with the third image sensor C13 and, on the other hand, the third image sensor C13 so as to acquire by this third image sensor C13, at least one image of the container is illuminated by the associated illumination zone S13. In accordance with the invention, the elementary light sources of the illumination zone S13 are controlled so that the illumination zone S13 has an angular width L13 identical to the angular width of the other illumination zones S11, S12 associated with the other image sensors.

In accordance with the invention, the elementary light sources of the illumination zone S13 are also controlled such that the illumination zone S13 associated with the third image sensor C13 extends with a symmetric angular width L13 relative to the observation direction D13 of this third image sensor C13. Thus, as shown in FIG. 3C, the angular width L13 is divided by the observation direction into two equal angular sectors.

In accordance with the invention, the elementary light sources of the illumination zone S13 are also controlled so that this illumination zone S13 and the angularly neighbouring illumination zone, namely the illumination zone S12, have a common illumination portion S113 as explained above.

The overlap between the adjacent illumination zones Sij and Sij+1 makes it possible, if necessary, to install an image sensor Cij' (with i the number of the inspection station and j the number of the image sensor) having an observation direction Dij' between the observation directions Dij and Dij+1 of an image sensor Cij and of the neighbouring image sensor Cij+1, and to control the elementary light sources in order to produce an illumination zone Sij' overlapping the illumination zones Sij and Sij+1. Due to the continuity of the emitting surfaces S1 S2, the illumination zone Sij' can have at least one uniform configuration and an angular width equal to that of the illumination zones Sij and Sij+1. This advantage is even more visible by considering the uniqueness of the diffuser which reinforces the continuity and spatial uniformity of illumination of the emitting surfaces S1, S2.

The method of inspection has been described in detail for a container 1 moved in the first inspection station I1. Of course, the method of inspection in accordance with the invention is implemented in the same way when the container 1 passes in the second inspection station I2. Thus, the elementary light sources of the illumination zones S21, S22, S23 are controlled in such a way that the at least three illumination zones S21, S22, S23 associated with the image sensors C21, C22, C23 have identical angular widths and extend with a symmetric angular width relative to the corresponding observation direction D21, D22, D23 of each image sensor, considering that at least two angularly neighbouring illumination zones S21-S22; S22-S23, have a common illumination portion S212, S213 with the condition that said two common illumination zones S212, S213 are not simultaneously illuminated. The inspection method in relation to this second inspection station is not described more precisely because it follows directly from the preceding description. It follows that the images of each container 1 are taken under identical illumination conditions whatever the observation directions of the image sensors. More specifically, the containers receive the light at the same angles of illumination.

According to an advantageous feature, the method aims to produce an analysis of the images taken for each container, with the images obtained from the various sensors Cij with the illumination zones Sij associated with the acquisitions and with the various observation directions Dij having the same configuration of the illumination zones. Such an analysis of the images taken for each container makes it possible to derive the information on the dimensions of the containers and/or on the optical singularities. In the example illustrated in the drawings, the method makes it possible to have, for each container, six images taken with the image sensors having the same configuration of the illumination zones.

Of course, the method can be implemented so as to increase the number of images taken for each of the containers passing in the inspection stations 11, 12. One solution consists of adding, in the first inspection station I1 and/or the second inspection station I2, one or more image sensors making it possible to increase the number of observation directions, as illustrated in particular by the exemplary embodiment illustrated in FIG. 8A comprising seven image sensors.

Another solution consists in changing the light sources L1, L2, in order to increase the number of observation directions of the image sensors by adjusting only the control of the first light source and/or second light source in order that each of them has a plurality of illumination zones with at least one first illumination configuration. The control system 10 thus controls the elementary light sources of the first light source and/or the second light source in order to create a plurality of illumination zones with at least one first illumination configuration. In addition to the increase in the number of observation directions of the image sensors, the method can also modify the values of the angles of the observation directions of the image sensors relative to the direction of movement. This modification of the values of the angles of the observation directions can be carried out by only adjusting the control. Of course, this modification of the values of the angles of the observation directions can be carried out without modifying the number of the directions of the image sensors. Alternatively, it is possible to move the image sensors or to modify the direction of their optical axes by only modifying the control methods for the illumination.

In order to increase the number of views taken, it can be provided that at least one image sensor acquires at least two images of each container in at least two different observation directions, following the movement of the container in the total observation field of the image sensor.

In the various alternative embodiments described above, in order to increase the number of views taken, the illumination zones have a single and same, so-called first, configuration. Of course, the illumination zones can have a plurality of illumination configurations depending on the type of control or observation desired, as already explained.

According to an alternative embodiment, the method provides, in each inspection station I1, I2, for each container inspected while passing:
  to provide at least three illumination zones S11, S12, S13-S2, S22, S23 for the emitting surface S1, S2 of each light source L1, L2, having at least the first identical illumination configuration, a second identical illumination configuration and a third identical illumination configuration;
  and when the container 1 is substantially centred on an observation direction D11, D12, D13, D21, D22, D23 of an image sensor, to successively acquire for each of said image sensors at least one image of the container illuminated by the associated illumination zone, having the first illumination configuration, at least one image of the container illuminated by the associated illumination zone, having the second illumination configuration and at least one image of the container illuminated by the associated illumination zone, having the third illumination configuration.

Thus, for such an alternative embodiment, it is possible to have, for each container 1, at least six images in at least six different observation directions, enabling the inspection of the entire periphery of each container, for each of the three different illumination configurations, in order to produce a plurality of inspection types, i.e. at least 18 images in total. The subject matter of the invention thus makes it possible to control diverse characteristics of the containers during a single passage in the inspection stations, with the possibility of revealing characteristics and/or defects as a function of the illumination configuration used.

According to an advantageous exemplary implementation, the at least three illumination zones S11, S12, S13-S21, S22, S23 have:
  as first identical illumination configuration Fb, a uniform luminous illumination zone inside a closed contour;
  as second identical illumination configuration Fa, a uniform luminous illumination zone inside a closed contour with angular width 40% less than the angular width of the first identical configuration;
  as third identical illumination configuration Fc, a variation in intensity, colour or polarisation between of the superposed regions parallel to the conveying plane PC.

In this example, the at least three illumination zones S11, S12, S13-S21, S22, S23 are each respectively associated with the image sensors C11, C12, C13-C21 C22 C23 and centred on their observation directions D11, D12, D13, D21, D22, D23, and each successively have at least a first, second and third illumination configuration. It is thus considered that the observation direction does not change between the successive image acquisitions of a container by the same image sensor. This is a simplification of the operation, which is acceptable because the actual movement is small between these acquisitions, so that the condition of centring the illuminated region on the observation direction of the associated image sensor, that is assumed to be fixed, is obtained.

According to an alternative embodiment of the invention, it is considered that when the image sensor C12 acquires three images of a same container passing in the inspection station I1, with an associated illumination zone S12 centred on the observation direction D12 having three illumination configurations Fa, Fb Fc modified at each acquisition, the observation direction D12 changes by virtue of the movement of the container, as can be seen between FIGS. 9A, 9B and then 9C. It is therefore advantageous that the illumination zone S12 moves to remain centred on the observation direction which varies. In other words, it could be considered that each image sensor C12 acquires three images in three different observation directions D12 by cooperating with three illumination zones S12 associated with the three observation directions.

The movement being small between two acquisitions, the illumination zones successively activated for a container, associated with the acquisitions by a given image sensor, overlap but are offset. This offset is of interest when the calculated movement of the intersection of the observation direction with the emitting surface between two successive acquisitions is greater than the smallest possible offset of the illumination zone which corresponds to the width of an elementary light source. Thus, for containers passing at a speed of 1 m/s with acquisitions spaced by 1 ms, the movement between two acquisitions by a same image sensor is on the order of a millimetre. Therefore, if the width of the elementary light sources is clearly greater than a millimetre, it is not of interest to provide this offset and the region remains fixed, in other words successive configurations associated with a same image sensor are superposed without offset, all being centred on the observation direction of an image sensor. This being said, the offset and overlap between the illumination zones associated with the different image sensors remains necessary in order to allow the reduction in the space requirement of the inspection stations.

Thus the method provides that in each inspection station I1-I2 for each container inspected while passing:
- to provide for the emitting surface S1-S2 of each light source L1, L2, at least nine illumination zones having at least
- the first identical illumination configuration, a second identical illumination configuration and a third illumination configuration,
- and when the container 1 is substantially centred on an observation direction of an image sensor C11, C12, C13, C21, C22, C23, to successively acquire for each of said image sensors, at least one image of the container illuminated by an associated illumination zone, having the first illumination configuration, at least one image of the container illuminated by an associated illumination zone having the second illumination configuration and at least one image of the container illuminated by an associated illumination zone, having the third illumination configuration.

According to an advantageous feature of the invention, the working distances W of the at least three image sensors C11, C12, C13 of the first station I1 are substantially identical for a same illumination configuration. The term substantially identical shall mean that there relative deviations are less than 10%.

According to an advantageous feature of the invention, the at least three image sensors C21, C22, C23 of the second inspection station have substantially identical working distances W.

In other words, according to a preferred alternative, the invention consists in providing, in an inspection station I1, I2, at least three image sensors C11, C12, C13-C21, C22, C23, all having an identical working distance W at the time of the acquisition of the images in a same illumination configuration.

According to another alternative of the invention, the at least three image sensors C21, C22, C23 of the second inspection station have working distances W identical to the working distances of the at least three image sensors C11, C12, C13 of the first inspection station. In other words, all the image sensors C11, C12, C13 and C21, C22, C23 of the two inspection stations have substantially identical working distances W.

In other words, according to another preferred alternative, the invention consists in providing, in a first inspection station I1, at least three image sensors C11, C12, C13 and, in a second inspection station I2, at least three image sensors C21, C22, C23, all having a substantially identical working distance W at the time of the acquisition of the images in a same illumination configuration.

Preferably, in order that the working distances W are substantially identical at the time of the acquisition of the images in a same illumination configuration, the device is designed so that the distances taken along the optical axis between the optical centres O of the sensors C11, C12, C13 and C21, C22, C23 and the path F of the containers are identical.

It is clear from the preceding description that the object of the invention has the advantage of having one or more light sources for which the emitting surface is homogeneous and continuous, enabling a large choice of observation directions of the image sensors, from any angles.

The method according to the invention makes it possible to improve the detection of the aspect of the containers by balancing the shadows of each side of the container, which improves the detection performance as can be seen in FIG. 5A in comparison with the views in FIG. 5B taken with a planar emitting source parallel to the path.

The method according to the invention can improve the detection of the aspect of the containers by revealing with the same contrast, a defect for example of the bubble type when it is positioned at the centre of the container, on so-called central views with the observation direction placed substantially at the level of the plane of symmetry of the light sources, but also on the so-called lateral views with the observation directions spaced apart on either side of the plane of symmetry of the light sources. This is due, on the one hand, to the curvature of the emitting surface S1, S2 of the light sources which keeps the distance between the emitting surface and the container almost constant, and, on the other hand, to the symmetry of the illumination zone relative to the observation direction, which thus contrasts a defect in the same manner, regardless of the image sensors which observe it.

Since the detection of the defects remains identical whatever the orientation of the container passing in the inspection stations, the method according to the invention enables a repetitive inspection by offering the acquisition of identical images whatever the orientation of the container and the observation direction, by ensuring that the at least six images of each configuration (aspect control or dimensional control or stress control or illumination pattern) are identical with one another. The method makes it possible to obtain the same image rendition, whatever the viewing angle of the image sensor around the container.

This repeatability is increased in the alternative of the invention according to which the working distances W of the image sensors are substantially identical. Indeed, this working distance W being identical, the angles $\gamma$ of the ray coming from the container relative to the observation direction are the same for the various images (FIG. 11). So that the apparent contrast of the defects, in particular those refracting the light, as well as the shadows at the edges of the containers, are the same because the optical paths from the source S1, S2 to the image sensors Cij are similar for the different images acquired by the different image sensors, for a given illumination configuration.

Furthermore, the method according to the invention has the advantage of being able to measure as many different diameters as the number of image sensors in a reduced space requirement, when the image sensors have observation directions that are all different from one another. Thus, the method makes it possible to carry out the analysis of the six images taken by the at least six image sensors at at least one given height in the images scanned from the bottom of the container to the top, in order to determine the distance between two opposite edges of the container. Such a distance makes it possible to derive a measurement of diameter in mm of the container at said height of the container. It is thus possible to determine information on the dimensions of the containers and, in particular, the dimensional conformity of the container on the basis of the measurements of at least six different diameters in six different observation directions, compared with the tolerance thresholds of diameter or the thresholds of non-circularity for at least one given height of the container.

According to an alternative embodiment illustrated in FIG. 7A, the first inspection station I1 comprises three image sensors C11, C12, C13 having observation directions with an angle of observation $\delta$ measured in the trigonometric direction relative to the direction of passage of 35°, 95° and 145° respectively, and the second inspection station I2 comprises three image sensors having observation directions with an angle of observation δ measured in the trigonometric direction relative to the direction of passage of 225°, 265° and 315° respectively. It is observed that the observation directions are straight lines, all having an angle in pairs of at least 10° between them. FIG. 7B shows, for a section through a supposedly cylindrical container, the diameters viewed by the six respective image sensors and it is observed therefore that six different diameters are measured (5°, 55°, 135°, 175°, 225°, 305°), which guarantees an improvement in the measurement of the ovality or "non-round" nature, in other words containers for which the normally round circumference is not round, often having a flat spot locally. By contrast, FIGS. 6A and 6B show a machine such that the two inspection stations I1 I2 each comprise, according to the prior art, the image sensors disposed symmetrically with respect to the conveyor, thus with only three different diameters measured. The mean error in the measurement of ovality is greater in the exemplary embodiment illustrated in FIGS. 6A, 6B relative to the example illustrated in FIGS. 7A and 7B. This reasoning considers telecentric aiming, but it applies mutatis mutandis in the common case of image sensors with non-telecentric optics but long focal lengths.

According to the invention, it is possible, due to the curved emitting surface, to have any number of image sensors with any observation direction, except in the axis of the conveyor. Thus, according to FIG. 8A, seven image sensors are disposed with their observation directions distributed angularly so that, as illustrated in FIG. 8B, seven different diameters are measured. Here too, the precision of measurement of the ovality and of the non-round containers is improved relative to a symmetric disposition of an even number of image sensors as proposed in the prior art.

The invention claimed is:

1. A method for inspecting containers moved in a conveying plane with a rectilinear path, the method comprising in a first inspection station:
    providing a first light source illuminating the containers along a first side of the path, comprising an emitting surface having a plane of symmetry perpendicular to the path and extending, on the one hand, in height in a vertical direction normal to the conveying plane and, on the other hand, over a total angular width, following a concave curve, the emitting surface being composed of a plurality of elementary light sources controlled so as to define at least three illumination zones having at least one first identical illumination configuration;
    providing at least three image sensors with total observation fields and disposed with optical axes in different directions along a second side of the path opposite the first side, in order to each have, during an image acquisition of a container present in its total observation field, an observation direction passing through the optical centre and the central axis of the container, the observation directions for the at least three image sensors being different straight lines and adjusted to recover the light coming from an associated illumination zone;
    and when a container in movement is successively located substantially centred on an observation direction of each of the image sensors, in order for each of said image sensors to acquire at least one image of the container illuminated by the associated illumination zone controlled to be switched on successively during the acquisition, having at least the first illumination configuration, the elementary light sources of the illumination zones being controlled in such a way that:
        the at least three illumination zones associated with the image sensors have identical angular widths;
        the at least three illumination zones associated with the image sensors extend with a symmetrical angular width relative to the corresponding observation direction;
        and at least two angularly neighbouring illumination zones, have a common illumination portion considering that said two illumination zones are not illuminated simultaneously.

2. The method according to claim 1, wherein in a second inspection station located downstream of the first inspection station in the direction of movement of the containers, the method comprises:
    providing a second light source illuminating the containers along the second side of the path, comprising an emitting surface having a plane of symmetry perpendicular to the path and extending, on the one hand, in height in a vertical direction normal to the conveying plane and, on the other hand, over a total angular width, following a concave curve, the emitting surface being composed of a plurality of elementary light sources controlled so as to define at least three illumination zones having at least one first identical illumination configuration;
    providing at least three image sensors with total observation fields and disposed with optical axes in different directions along the first side of the path, in order to each have, during an image acquisition of a container present in its total observation field, an observation direction passing through the optical centre and the central axis of the container, the observation directions for the at least three image sensors being different straight lines and adjusted to recover the light coming from an associated illumination zone;
    and when a container in movement is successively located substantially centred on an observation direction of each of the image sensors, in order for each of said image sensors to acquire at least one image of the container illuminated by the associated illumination zone controlled to be switched on successively during the acquisition, having at least the first illumination configuration, the elementary light sources of the illumination zones being controlled in such a way that:
        the at least three illumination zones associated with the image sensors have identical angular widths;
        the at least three illumination zones associated with the image sensors extend with a symmetrical angular width relative to the corresponding observation direction;
        and at least two angularly neighbouring illumination zones, have a common illumination portion considering that said two illumination zones are not illuminated simultaneously.

3. The method according to claim 1, wherein the first light source is provided with an emitting surface produced by a portion of a generalised cylinder created by a generatrix produced by a segment of vertical straight line and a concave directrix curve in the conveying plane, the concavity of which is turned towards the containers.

4. The method according to claim 1, wherein the first light source is provided with an emitting surface with a total angular width between 10° and 175°.

5. The method according to claim 1, wherein the first light source is provided with an emitting surface for which the directrix curve is an arc of a circle.

6. The method according to claim 1, wherein the first light source is provided with an emitting surface having, in the conveying plane, a width between 500 mm and 700 mm and a depth between 100 mm and 350 mm.

7. The method according to claim 1, wherein the first light source is provided with an emitting surface embodied by a backlit one-piece diffuser.

8. The method according to claim 1, wherein in the first inspection station:
at least three illumination zones are provided for the emitting surface of the first light source, having at least the first identical illumination configuration, a second identical illumination configuration and a third identical illumination configuration;
and when a container is substantially centred on an observation direction of an image sensor, in order for each of said image sensors to successively acquire at least one image of the container illuminated by the associated illumination zone, having the first illumination configuration, at least one image of the container illuminated by the associated illumination zone, having the second illumination configuration and at least one image of the container illuminated by the associated illumination zone, having the third illumination configuration.

9. The method according to claim 1, wherein in the first inspection station at least three illumination zones are provided for the emitting surface of the first light source, having:
as a first identical illumination configuration, an extended configuration with suitable homogeneous pattern;
as a second identical illumination configuration, a restricted homogeneous configuration;
as a third identical illumination configuration, a structured configuration.

10. The method according claim 2, wherein at least three image sensors are provided in the first inspection station and at least three image sensors are provided in the second inspection station, said at least six image sensors having at least six observation directions spaced apart in pairs by at least 10°.

11. The method according to claim 2, wherein:
in the first inspection station, at least three image sensors are provided having observation directions spaced apart in pairs by an angle of at least 30 degrees and preferably at least 40°;
in the second inspection station, at least three image sensors are provided having observation directions spaced apart in pairs by an angle of at least 30 degrees and preferably at least 40°.

12. The method according to claim 2, wherein, the number and/or angular value of the observation directions of the image sensors relative to the direction of movement are modified by only adjusting the control of the first light source, and/or of the second light source, in order to have at least three illumination zones having at least one first illumination configuration.

13. The method according to claim 2, wherein the number of observation directions of the image sensors is increased by adding image sensors.

14. The method according to claim 2, wherein at least one image sensor acquires at least two images of each container in at least two different observation directions, following the movement of the container in the total observation field of the image sensor.

15. The method according to claim 1, wherein an analysis of the images taken by the image sensors with the same configuration of the illumination zones is carried out in order to derive information concerning defects and/or dimensions of the containers.

16. The method according to claim 10, wherein:
the analysis of the six images taken by the at least six image sensors is carried out at at least one given height in the images scanned from the bottom of the container to the top, in order to determine the distance between two opposite edges of the container, in order to derive a measurement of the diameter of the container at said height,
the dimensional conformity of the container is determined on the basis of the measurements of at least six different diameters in six different directions compared with diameter tolerance thresholds or non-circularity thresholds for at least one given height of the container.

17. The method according to claim 1 consisting in providing, in one inspection station, at least three image sensors, having a substantially identical working distance at the time of acquisition of the images with a same illumination configuration.

18. The method according to claim 17 consisting in providing, in a first inspection station, at least three image sensors and, in a second inspection station, at least three image sensors, each having a substantially identical working distance at the time of acquisition of the images with a same illumination configuration.

19. A device for inspecting containers moved in a conveying plane with a rectilinear path, this inspection device comprising:
a first inspection station comprising:
a first light source along a first side of the path, comprising an emitting surface having a plane of symmetry perpendicular to the path and extending, on the one hand, in height in a vertical direction normal to the conveying plane and, on the other hand, over a total angular width following a concave curve, the emitting surface being composed of a plurality of elementary light sources controlled so as to define at least three illumination zones having at least one first identical illumination configuration;
at least three image sensors with total observation fields and disposed with optical axes in different directions along a second side of the path opposite the first side, in order to each have, during an image acquisition of a container present in its total observation field, an observation direction passing through the optical centre and the central axis of the container, the observation directions for the image sensors being different and adjusted to recover the light coming from an associated illumination zone;
a second inspection station located downstream of the first inspection station in the direction of movement of the containers, this second inspection station comprising:
a second light source along the second side of the path, comprising an emitting surface having a plane of symmetry perpendicular to the path and extending, on the one hand, in height in a vertical direction normal to the conveying plane and, on the other hand, over a total angular width following a concave curve, the emitting surface being composed of a plurality of elementary light sources controlled so as to define at least three illumination zones having at least one first identical illumination configuration;
at least three image sensors with total observation fields and disposed with optical axes in different directions along the first side of the path, in order to each have, during an image acquisition of a container present in its total observation field, an observation direction passing through the optical centre and the central axis of the container, the observation directions for the image sensors being adjusted to recover the light coming from an associated illumination zone, the observation directions for the image sensors of the second inspection station being mutually different straight lines and different from the observation directions of the image sensors of the first inspection station;

and a control system of the light sources and the image sensors configured so that when a container in movement is successively located substantially centred on an observation direction of each of the image sensors, in order for each of said image sensors to acquire at least one image of the container illuminated by the associated illumination zone controlled to be switched on successively during the acquisition, having at least the first illumination configuration, the elementary light sources of the illumination zones being controlled in such a way that:

the at least three illumination zones of each inspection station associated with the image sensors have identical angular widths;

the at least three illumination zones of each inspection station associated with the image sensors extend with a symmetric angular width relative to the corresponding observation direction;

and at least two angularly neighbouring illumination zones of each inspection station, have a common illumination portion considering that said two illumination zones are not simultaneously illuminated.

20. The inspection device according to claim 19, wherein the at least three image sensors of each inspection station have observation directions which are straight lines spaced apart in pairs by an angle of at least 30° and preferably at least 40°.

21. The inspection device according to claim 19, wherein the at least three image sensors of the first station and the at least three image sensors of the second station have at least six observation directions spaced apart in pairs by at least 10°.

22. The inspection device according to claim 19, wherein the first light source and/or the second light source have an emitting surface having, in the conveying plane, a width between 500 mm and 700 mm and a depth between 100 mm and 350 mm.

23. The inspection device according to claim 19, wherein the first light source and the second light source are positioned so that the emitting surfaces of the light sources have a space requirement between 1000 mm and 1400 mm.

24. The inspection device according to claim 19, wherein the emitting surface of the first light source and/or of the second light source is embodied by a backlit one-piece diffuser.

25. The inspection device according to claim 19, wherein at least three image sensors, in an inspection station, each have a substantially identical working distance taken along the optical axis between their optical centre and the path of the containers.

26. The inspection device according to claim 19, wherein at least three image sensors in a first inspection station and at least three image sensors in a second inspection station each have a substantially identical working distance taken along the optical axis between their optical centre and the path of the containers.

* * * * *